(12) United States Patent
Kim

(10) Patent No.: US 10,463,959 B2
(45) Date of Patent: Nov. 5, 2019

(54) TIMING DETERMINATION-TYPE GAMING DEVICE AND METHOD

(71) Applicant: Jin Young Kim, Jeju (KR)

(72) Inventor: Jin Young Kim, Jeju (KR)

( * ) Notice: Subject to any disclaimer, the term of this patent is extended or adjusted under 35 U.S.C. 154(b) by 0 days.

(21) Appl. No.: 15/770,180

(22) PCT Filed: Dec. 7, 2016

(86) PCT No.: PCT/KR2016/014316
§ 371 (c)(1),
(2) Date: Apr. 20, 2018

(87) PCT Pub. No.: WO2017/122932
PCT Pub. Date: Jul. 20, 2017

(65) Prior Publication Data
US 2018/0311580 A1    Nov. 1, 2018

(30) Foreign Application Priority Data

Jan. 12, 2016  (KR) .................. 10-2016-0003556
Apr. 21, 2016  (KR) .................. 10-2016-0048836

(51) Int. Cl.
*A63F 13/44*      (2014.01)
*A63F 13/814*     (2014.01)
(Continued)

(52) U.S. Cl.
CPC .......... *A63F 13/44* (2014.09); *A63F 13/2145* (2014.09); *A63F 13/52* (2014.09); *A63F 13/814* (2014.09)

(58) Field of Classification Search
CPC ...... A63F 13/44; A63F 13/2145; A63F 13/52; A63F 13/814
See application file for complete search history.

(56) References Cited

U.S. PATENT DOCUMENTS 8,003,872 B2 *  8/2011  Lopiccolo .............. G10H 1/342
                                                  463/43
8,629,342 B2 *  1/2014  Lee ....................... G09B 15/00
                                                  84/477 R
(Continued)

FOREIGN PATENT DOCUMENTS

KR   10-2010-0096606 A    9/2010
KR   10-2010-0114783 A    10/2010
(Continued)

OTHER PUBLICATIONS

EMP-KOUHZ "xi-ANIMA [K-shoot mania Edit]", Jun. 16, 2015, pp. 1-24, Internet Search: <URL: https://www.youtube.com/watch?v=75Lz2M3EHDM>.

(Continued)

*Primary Examiner* — Corbett B Coburn

(57) ABSTRACT

Disclosed are a timing determination-type game apparatus and method. The present invention may provide a new type of timing determination-type game in which a user operates at least one timing pointer or at least one input pointer to match each other at the same position at a designated timing while moving at least one timing pointer or at least one input pointer in the unit of a group regardless of a path. Further, according to the present invention, it is possible to simultaneously move a plurality of timing pointers or a plurality of input pointers in the unit of the group without damaging timing information provided by the timing pointer and the input pointer, thereby providing various user interfaces for operating the game.

15 Claims, 14 Drawing Sheets

(51) Int. Cl.
A63F 13/2145 (2014.01)
A63F 13/52 (2014.01)

(56) References Cited

U.S. PATENT DOCUMENTS 9,799,314 B2 * 10/2017 Lopiccolo ................ G10H 1/42
2014/0080557 A1 * 3/2014 O ........................ G06Q 30/0601
463/7
2014/0352521 A1 * 12/2014 Takahashi ............... G04F 5/025
84/484

FOREIGN PATENT DOCUMENTS

| KR | 10-2012-0019566 A | 3/2012 |
| KR | 10-2013-0065751 A | 6/2013 |
| KR | 10-2015-0051307 A | 5/2015 |

OTHER PUBLICATIONS

International Search Report for International Patent Application No. PCT/KR2016/014316, dated Mar. 15, 2017.

\* cited by examiner

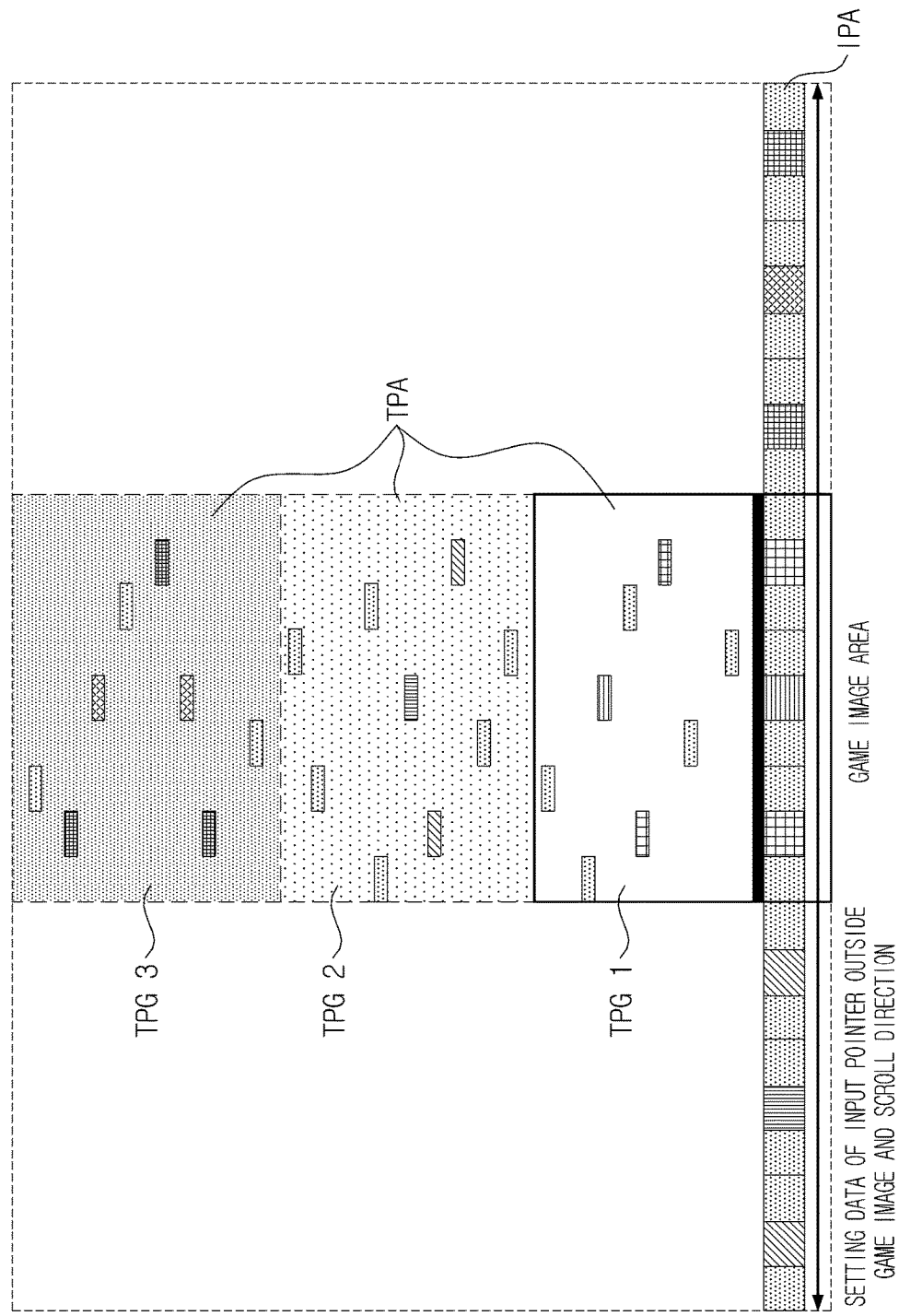

TIMING DETERMINATION-TYPE GAMING DEVICE AND METHOD

CROSS-REFERENCE TO RELATED APPLICATIONS

This application is a U.S. National Stage of International Patent Application No. PCT/KR2016/014316, filed on Dec. 7, 2016, which claims priority to and the benefit of Korean Patent Application No. 10-2016-0003556 filed in the Korean Intellectual Property Office on Jan. 12, 2016, Korean Patent Application No. 10-2016-0048836 filed in the Korean Intellectual Property Office on Apr. 21, 2016, the entire contents of which are incorporated herein by reference.

TECHNICAL FIELD

The present invention relates to a game apparatus and a game method, and particularly, to timing determination-type game apparatus and method.

BACKGROUND ART

Timing determination games (a music game or a rhythm game) generally provide a timing pointer moving along a designated path (generally, a track) and an input pointer (or an input pointing line) disposed at a predetermined position of the path and designating an input timing of a user. The timing determination game progresses in a scheme in which whether a timing input of a user is performed is determined based on a time at which a timing pointer moves along a path and reaches a position at which the timing pointer matches an input pointer disposed on the path.

That is, the timing determination game provides the user with the timing pointer and the input pointer as visual guidance signs to enable the user to perform a timing input of a designated position in accordance with a pre-designated timing by referring to the timing pointer and the input pointer. Further, a timing determination-type game apparatus has a scheme in which accuracy of an input timing and an input position for a timing input of a user are measured to enable the user to enjoy the game.

The timing determination games have the scheme, which is familiar to players having abilities to react visually and senses to timing, and are continuously released in various forms while some interfaces thereof are changed. However, even though the interface is changed, the actual game progress scheme is the same, so that the user feels like that the user plays the similar game regardless of the level of difficulty. Accordingly, the timing determination games have the limitations in that the users are easily bored with the game. In this respect, in the existing timing determination games, various methods of capable of providing a higher level of difficulty are suggested so as to prevent the users from being bored.

FIG. 1 illustrates an example of a track-type timing determination game in the related art.

FIG. 1 illustrates an example of an image of a timing determination-type game conceived for providing a player with a high level of difficulty. As illustrated in FIG. 1, in the related art, the level of difficulty of the game is raised by considerably increasing a density of the disposed timing pointers or intentionally providing the unintuitive disposition of the timing pointers and input controllers. However, the method of raising the level of difficulty of the game, which is illustrated in FIG. 1, has a problem in that the users feel distressed or unpleasant rather than having fun. Accordingly, the method of raising the level of difficulty of the game is a factor making the user lose interest in the game and makes a new user get used to the game, thereby making it difficult to create a new user.

SUMMARY OF THE INVENTION

The present invention has been made in an effort to provide a timing determination-type game apparatus which provides a user with an intuitive game operation interface and provides the user with a different type of game operation scheme from that of the related art, thereby arousing the user's interest.

The present invention has also been made in an effort to provide a timing determination-type game method for achieving the above object.

An exemplary embodiment of the present invention provides a timing determination-type game apparatus, including: an interface unit which receives a user command and outputs a game image; and a game control unit which configures a game image, in which one or more timing pointer groups including one or more timing pointers and one or more input pointer groups including one or more input pointers are displayed according to pre-stored game data, outputs the configured game image to a user via the interface unit, moves at least one group corresponding to the user command among the one or more timing pointer groups and the one or more input pointer groups, and determines whether the one or more timing pointers included in the one or more timing pointer groups matches the one or more input pointers that are designated to correspond to the one or more timing pointers at a timing pre-designated by the game data, respectively.

The game control unit may include: a memory unit in which the game data is pre-stored; an input analyzing unit which receives the user command from the interface unit, analyzes the received user command, and generates an operation signal corresponding to the user command when it is determined that the user command is a command applied for progressing a game; a pointer control unit which receives the game data stored in the memory unit, displays each of the one or more timing pointer groups and the one or more input pointer groups on the game image at a pre-designated timing according to the game data, controls each of the one or more timing pointers to move along a designated movement path, and moves at least one group among the one or more timing pointer groups and the one or more input pointer groups in a direction designated by the operation signal in response to the operation signal; a matching determination unit which determines whether the one or more timing pointers match the corresponding one or more input pointers at the designated timing, respectively, and outputs a determination result; and an image configuring unit which receives image data included in the game data from the memory unit, receives timing pointer information and input pointer information from the pointer control unit, receives the determination result from the matching determination unit, configures the game image, and outputs the configured game image via the interface unit.

The pointer control unit may further include: a timing pointer control unit which acquires timing pointer data included in the game data, sets a time and a position at which the one or more timing pointer groups including the one or more timing pointers are to be displayed in a timing pointer area in which the one or more timing pointer groups are disposed in the game image, an attribute enabling the user to visually discriminate the one or more timing pointers included in the one or more timing pointer groups, respectively, and the movement path according to the acquired timing pointer data, and varies the positions of the one or more timing pointer groups within the timing pointer area according to the operation signal to generate the timing pointer information when the operation signal is the operation signal for the timing pointer group; and an input pointer control unit which acquires input pointer data included in the game data, sets a time and a position at which the one or more input pointer groups including the one or more input pointers are to be displayed in an input pointer area in which the one or more input pointer groups are disposed in the game image, and an attribute enabling the user to visually discriminate the one or more input pointers included in the one or more input pointer groups corresponding to the one or more timing pointers, respectively, according to the acquired input pointer data, and the position of the one or more input pointer groups within the input pointer area according to the operation signal to generate the input pointer information when the operation signal is the operation signal for the input pointer group.

Another exemplary embodiment of the present invention provides a timing determination-type game method of a timing determination-type game apparatus including an interface unit and a game control unit, the timing determination-type game method including: analyzing, by the game control unit, pre-stored game data, and configuring a game image in which one or more timing pointer groups including one or more timing pointers and one or more input pointer groups including one or more input pointers corresponding to one or more timing pointers are displayed according to the analyzed game data; when a user command applied via the interface unit is a command applied for progressing a game, generating, by the game control unit, an operation signal, and moving at least one group among the one or more timing pointer groups and the one or more input pointer groups in response to the operation signal; and determining whether the one or more timing pointers included in the one or more timing pointer groups match the one or more input pointers that are designated to correspond to the one or more timing pointers at a timing pre-designated by the game data, respectively.

Accordingly, unlike the existing game in which a user simply performs a timing input to an input position at a designated input timing through a timing pointer moving along a designated path and a corresponding input pointer disposed in the path, the time determination-type game apparatus and method of the present invention may provide a new type of timing determination-type game in which a user operates at least one timing pointer and at least one input pointer to match with each other at the same position at a designated timing while moving the at least one timing pointer or the at least one input pointer in the unit of a group regardless of a path. Accordingly, the time determination-type game apparatus and method of the present invention may increase the user's interests in the game without causing uncomfortableness to the user. Further, according to the time determination-type game apparatus and method of the present invention, since the timing pointer or the input pointer move in the unit of the group, it is possible to simultaneously move the plurality of timing pointers or the plurality of input pointers in the unit of the group without damaging timing information provided by the timing pointer and the input pointer, thereby providing various user interfaces for operating the game.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 11A to 11C are diagrams illustrating scroll regions of the timing determination-type game of the present invention.

Figure 1:
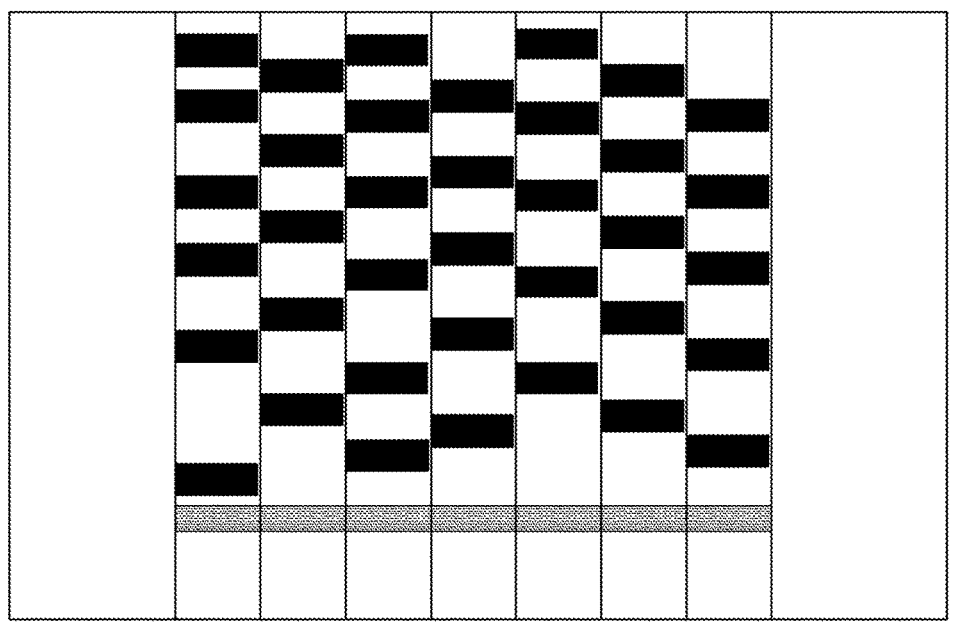
FIG. 1 is a diagram illustrating an example of a timing determination-type game in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The present invention, an operational advantage of the present invention, and an object achieved through the implementation of the present invention will be fully understood with the reference to the accompanying drawings exemplifying an exemplary embodiment of the present invention and contents described in the drawings.

Hereinafter, the present invention will be described in detail by describing an exemplary embodiment of the present invention with reference to the accompanying drawings. However, the present invention may be implemented in various different forms, and is not limited to the described exemplary embodiment. Further, a part irrelevant to the description will be omitted for clearly describing the present invention, and the same reference numeral of the drawing indicates the same member.

Throughout the specification, unless explicitly described to the contrary, when it is said that a part "comprises/includes" a constituent element, this means that another constituent element may be further "included/comprised", not that another constituent element is excluded. In addition, the terms "-unit", "-or", "module", and "block" described in the specification mean unit for processing at least one function and operation and may be implemented by hardware components, software components, or combinations thereof.

Figure 2:
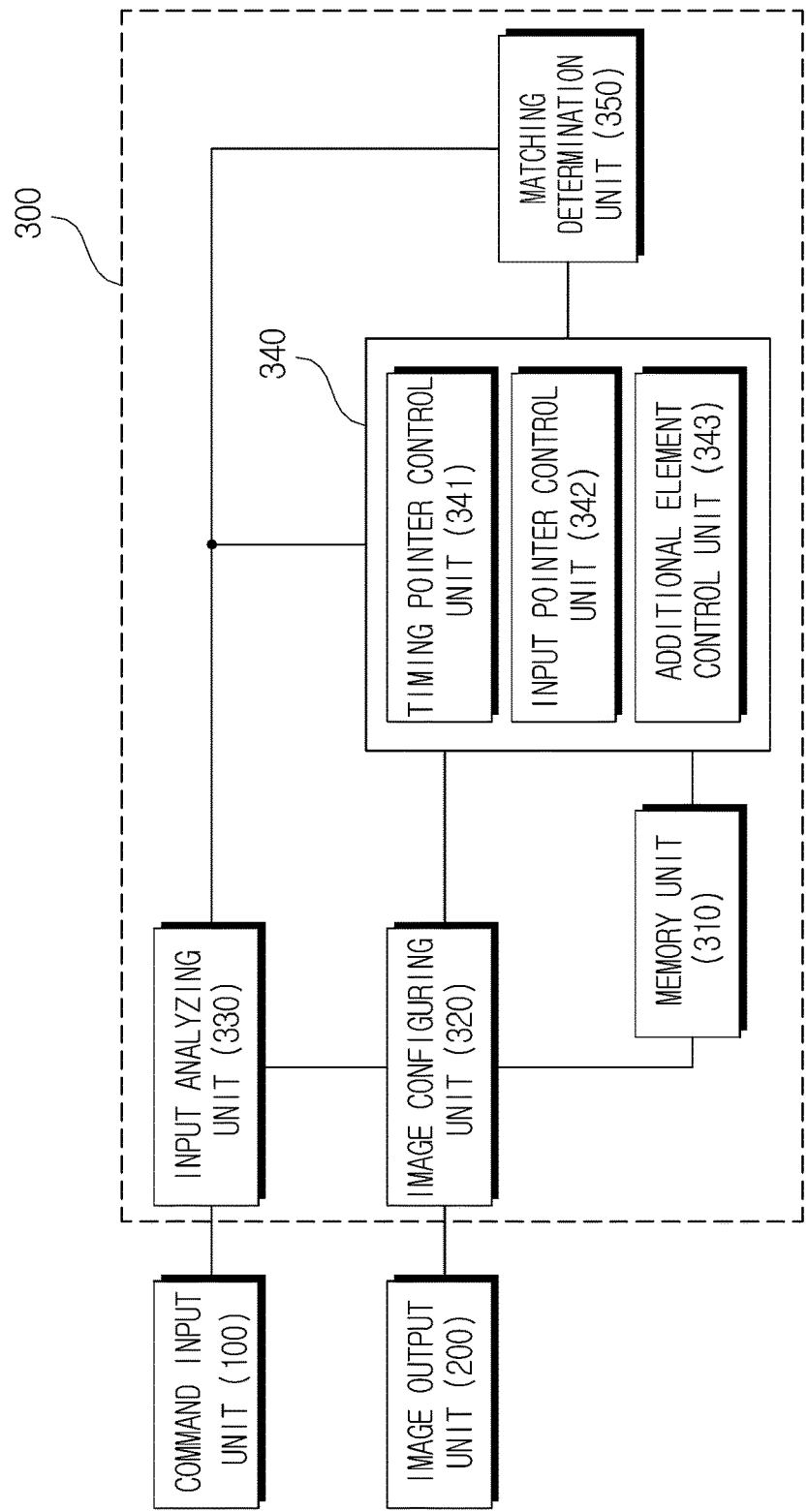
FIG. 2 is a diagram illustrating a configuration of a timing determination-type game apparatus according to the present invention.

FIG. 2 is a diagram illustrating a configuration of a timing determination-type game apparatus according to the present invention.

Referring to FIG. 2, the timing determination-type game apparatus of the present invention includes a command input unit 100, an image output unit 200, and a game control unit 300.

The command input unit 100 includes at least one command input means, and receives a user command and transmits the received user command to the game control unit 300. In the present invention, the command input unit 100 is an input means receiving a user command, and may be implemented by various devices, such as a button, a joystick, a keyboard, a mouse, a jog shuttle (jog dial), and a touch panel. The command input unit 100 may also be implemented by one of the various input means, and may also be implemented by a combination of a plurality of input means.

However, recently, since a field to which a touch-based user interface is applied has been markedly expanded, the present invention will be described on an assumption that the command input unit 100 is implemented by a touch panel including at least one touch sensor detecting a touch of a user, as a representative example.

The image output unit 200 may be implemented by a display device, and displays a game image applied from the game control unit 300 to a user. In the present invention, the image output unit 200 may display a timing pointer group including at least one timing pointer and at least one input pointer group corresponding to the timing pointer group on a game image under the control of the game control unit 300. Herein, the input pointer group may include at least one input pointer corresponding to at least one timing pointer included in the timing pointer group. Further, the image output unit 200 may additionally display a track, which indicates a basic movement path and a movement range of each of at least one timing pointer and a timing determination line which designates a position at which at least one timing pointer of the timing pointer group is to be disposed at a designated timing on the game image under the control of the game control unit 300.

The image output unit 200 may include an obstacle pointer, which is the target with which a moving timing pointer needs to avoid a collision, and a result of determining whether the timing pointer moved in response to the user command is disposed at a designated position at a designated timing in the game image and display the obstacle pointer and the determination result to the user.

The command input unit 100 and the image output unit 200 may be implemented by separate devices, but may also be implemented by one combined device, such as a touch screen.

Although not illustrated, the timing determination-type game apparatus of the present invention may further include a sound output unit (not illustrated) in addition to the image output unit 200. The sound output unit may be implemented by a sound output device, such as a speaker, so that the timing determination-type game apparatus may provide a user with a sound, as well as the game image.

The command input unit 100, the image output unit 200, and the sound output unit (not illustrated) may be configured as an interface unit performing interfacing with a user, and in addition to the command input unit 100, the image output unit 200, and the sound output unit (not illustrated), various user interface means may be included in the interface unit.

The game control unit 300 configures a game image in which at least one timing pointer group and at least one input pointer corresponding to the at least one timing pointer group may be displayed according to pre-stored game data and transmits the configured game image to the image output unit 200. Further, the game control unit 300 receives an operation signal from the command input unit 100 and analyzes the received operation signal.

In the present invention, the game control unit 300 may move and control at least one timing pointer group in the unit of a group in response to a user command. The game control unit 300 basically controls a timing pointer of at least one timing pointer group to move along a path, such as a track, pre-designated by game data, but when a user command is applied, the game control unit 300 controls all of the timing pointers of at least one timing pointer group to move in a different direction, not a designated path, in response to the user command.

That is, in the present invention, the game control unit 300 does not individually control at least one timing pointer included in at least one timing pointer group, but collectively controls all of the timing pointers included in the timing pointer group to move in a different direction from the path in response to the user command.

The game control unit 300 may include a control result according to the user command in the game image again and output the game image to the image output unit 200 to enable the user to check a game progress state. Herein, the control result according to the user command may include the movement of the timing pointer group, an indication of determining whether the timing pointer reaches the designated position at the timing designated by the game data, and the like.

The game control unit 300 will be described in detail with reference to FIG. 2. The game control unit 300 may include a memory unit 310, an image configuring unit 320, an input analyzing unit 330, a pointer control unit 340, and a matching determination unit 350.

The memory unit 310 pre-stores game data required for progressing a game. Image data and sound data, such as a game background image and game background music, to be displayed through the image output unit 200 when the game progresses, and timing pointer data and an input pointer data including designated timings and positions at which at least one timing pointer and at least one input pointer that are the game constituent elements are to be displayed, attributes and movement paths of at least one timing pointer and at least one input pointer, and the like are included in the game data and stored in the memory unit 310. As described above, in the timing determination-type game of the present invention, since at least one timing pointer is not individually controlled, but is controlled in the unit of the group, the memory unit 310 may also store information on the timing pointer group in which each of at least one timing pointer is to be included as the timing pointer data. Further, information on the input pointer group corresponding to the timing pointer group may be stored in the input pointer data.

The game data stored in the memory unit 310 may further include data for a track, a timing determination line, and an obstacle pointer that are the game configuring elements, like the timing pointer data and the input pointer data. Depending on a case, the memory unit 310 may additionally store option setting information that is information on various options which are changed in the game data and are applicable during an execution of the game. The option setting information may include a pre-designated initial value and may be changed in response to a user command. Herein, the option setting information may include a game image display direction track, whether to display the timing determination line, and the like.

The image configuring unit 320 receives the image data, such as a game background image, from the memory unit 310, configures a game image, and transmits the configured game image to the image output unit 200. Further, when the timing pointer information and the input pointer information are received from the pointer control unit 340, the image configuring unit 320 may include at least one timing pointer and at least one input pointer corresponding to the at least one timing pointer in the game image according to the received timing pointer information and the received input pointer information when configuring the game image to be transmitted to the image output unit 200, and transmit the game image to the image output unit 200.

The image configuring unit 320 may include a track and a timing determination line in the game image, and may receive information on a result of determining an operation signal applied from the input analyzing unit 330 from the matching determination unit 350 and enable the determination result to be displayed on the game image. That is, the image configuring unit 320 enables the game progress state according to the user command input of the user to be displayed on the game image.

When the user command is applied from the command input unit 100, the input analyzing unit 330 analyzes the applied user command, and when it is determined that the analyzed user command is the command applied for progressing the game by the user, the input analyzing unit 330 generates an operation signal corresponding to the user command, transmits the generated operation signal to the image configuring unit 320, the pointer control unit 340, and the matching determination unit 350, and makes the user command be reflected in the game.

The pointer control unit 340 receives the game data stored in the memory unit 310, and controls at least one timing pointer, at least one input pointer, the track, the timing determination line, the obstacle, and the like which are the game configuring elements, according to the received game data. Further, when the operation signal is applied via the input analyzing unit 320, the pointer control unit 340 analyzes the operation signal, and additionally controls the game configuring element, such as the timing pointer, operable by the user among the game configuring elements in response to the analyzed operation signal. That is, the pointer control unit 340 enables the user to progress the game.

The pointer control unit 340 may include a timing pointer control unit 341 for controlling a timing pointer of at least one timing pointer group, an input pointer control unit 342 for controlling an input pointer, and an additional element control unit 343 for controlling additional game configuring elements, such as a track, a timing determination line, and an obstacle.

The timing pointer control unit 341 acquires the timing pointer data from the game data stored in the memory unit 310, sets a time and a position at which at least one timing pointer included in at least one timing pointer group is to be displayed on the game image, and an attribute of the at least one timing pointer according to the acquired timing pointer data, and generates timing pointer information. Further, the timing pointer control unit 341 transmits the generated timing pointer information to the image configuring unit 320 and the matching determination unit 350. Herein, the attribute of the timing pointer includes setting for an identification form, such as a shape, a color, and a size, of each of the timing pointers, and additionally, an identification form for discriminating the timing pointer groups including the timing pointers may also be set and included in the attribute of the timing pointer.

In general, in the timing determination-type game, the timing pointer is pre-set in the timing pointer data so that a position of the timing pointer is changed on the game image during the progress of the game so as to enable the user to recognize that the timing pointer moves along a designated path (herein, a track). Accordingly, when the operation signal for the timing pointer is not applied from the input analyzing unit 330, the timing pointer control unit 341 generates timing pointer information so that the timing pointer is displayed at a time and a position designated by the timing pointer data on the game image, and transmits the generated timing pointer information to the image configuring unit 320 and the matching determination unit 350.

That is, the timing pointer control unit 341 controls each of at least one timing pointer included in at least one timing pointer group to gradually move in a direction in which the timing determination line or the input pointer is disposed. In this case, the timing pointer control unit 341 controls each of at least one timing pointer included in the timing pointer group to move along the path pre-designated in the timing pointer data, and in the present invention, it is assumed that the timing pointer moves along a corresponding track among the plurality of tracks set by the additional element control unit 343, as an example.

In the meantime, when the operation signal for the timing pointer is applied from the input analyzing unit 330, the timing pointer control unit 341 additionally reflects the movement corresponding to the operation signal in the movement of the timing pointer set by the timing pointer data and generates timing pointer information. That is, the timing pointer control unit 341 controls the timing pointer to move along the pre-designated path according to the timing pointer data and simultaneously to move in a direction corresponding to the operation signal and a speed corresponding thereto. Herein, the movement direction of the timing pointer corresponding to the operation signal is a direction different from the movement direction of the timing pointer designated in the timing pointer data, and may be a direction that is across the track.

In general, the movement direction of the timing pointer according to the timing pointer data is set to a direction in which the input pointer is disposed on the game image. That is, the timing pointer moves at a pre-designated speed in a pre-designated direction so as to reach the input pointer or the timing determination line at the pre-designated timing according to the timing pointer data. However, when the timing pointer moves in the movement direction designated in the timing pointer data or in a reverse direction in response to the operation signal, the timing at which the timing pointer reaches the input pointer or the timing determination line is changed, so that there is a problem in that the user cannot smoothly progress the game. Accordingly, even when the operation signal is applied, the timing pointer control unit 341 may limit the movement direction of the timing pointer according to the operation signal so that the timing pointer reaches the input pointer or the timing determination line at the designated timing. As an example, the timing pointer control unit 341 may perform a control of extracting only a component, which is vertical to the movement direction of the timing pointer or parallel to the timing determination line according to the timing pointer data, from the operation signal, and reflecting the extracted component in the timing pointer.

Particularly, in the present invention, when the operation signal is received, the timing pointer control unit 341 may control the timing pointers to individually move in response to the operation signal, but basically controls the entire timing pointers included in the timing pointer group including the corresponding timing pointer to identically move.

Since the entire timing pointers included in the timing pointer group may simultaneously move in response to the operation signal, the user may progress the game by a scheme of moving the timing pointer group and adjusting a position of each of the timing pointers before the timing pointers reach the input pointers or the timing determination line. For example, even when 20 timing pointers are displayed on the game image, but the 20 timing pointers are divided into two timing pointer groups, the user may progress the game by simply operating the movement of only the two timing pointer groups. This enables the user to easily progress the game only with two fingers when the interface unit of the timing determination-type game apparatus is implemented by a device, such as a touch screen.

The timing pointer control unit 341 may add and generate a group attribute into the timing pointer information so as to enable the user to easily discriminate the plurality of timing pointer groups, respectively, and enable the user to select the timing pointer group desired to be operated and input a user command. When the group attribute is added into the timing pointer information, characteristics according to the group attributes of the groups of the timing pointers are divided and displayed for each group on the game image, and the user may select and operate the divided and displayed timing pointer group.

In the meantime, the input pointer control unit 342 acquires the input pointer data from the game data stored in the memory unit 310, and sets a time and a position at which at least one input pointer is to be displayed on the game image and an attribute of the input pointer according to the acquired input pointer data and generates input pointer information. Then, the input pointer control unit 342 transmits the generated input pointer information to the image configuring unit 320 and the matching determination unit 350. Herein, similar to the attribute of the timing pointer, the attribute of the input pointer represents an identification form, such as a shape, a color, and a size, of each of the input pointers for discriminating the input pointers, respectively. The attribute of the input pointer may be set to have the same attribute as that of the timing pointer so that the user may easily recognize that each of at least one input pointer is the input pointer corresponding to the timing pointer displayed on the game image. Depending on the case, the level of difficulty of the game may be further raised by setting the corresponding timing pointer and input pointer to have only the same color or have only the same form, but the corresponding timing pointer and input pointer may be set to have both the same color and the same form, if possible, to enable the user to intuitively enjoy the game.

In the meantime, in general, in the timing determination-type game, the input pointer is fixed at an initially displayed position on the game image and disappears after a predetermined time (for example, until the timing pointer reaches the timing determination line). That is, the input pointer control unit 342 generates the input pointer information so that the input pointer having the pre-designated attribute is displayed at the designated position for the designated time.

However, in the timing determination-type game of the present invention, the input pointer may also be configured to move in response to the operation signal, instead of the timing pointer. In this case, the input pointer control unit 342 controls the input pointer to move in a direction and at a speed designated by the operation signal. In this case, the input pointer designated by the operation signal may be moved in a direction parallel to the timing determination line, similar to the timing pointer. In the meantime, when the plurality of input pointers is displayed on the game image, it is difficult for the user to individually control the plurality of input pointers. In this case, similar to the timing pointer, an input pointer group is set in the input pointer data, and the input pointer control unit 342 may control the input pointer displayed on the game image to move together with other input pointers within the corresponding group in response to the operation signal.

In order for the user to control the input pointers in the unit of the group, information on the input pointer group including each input pointer and an identification form for discriminating the input pointer groups may be included in the attribute of the input pointer.

In the foregoing, the case where only one of the timing pointer group and the input pointer group moves in response to the operation signal has been described, but depending on the case, both the timing pointer group and the input pointer group may also be set to move in response to the operation signal.

When the game starts, the additional element control unit 343 acquires the basic game data for the basic configuring elements, such as the background image, a menu, and the option setting, for executing the game from the game data stored in the memory unit 310 and analyzes the basic game data, generates basic game information according to the analyzed basic configuring element data, and transmits the generated basic game information to the image configuring unit 320. The image configuring unit 320 receives the basic game information and outputs the received basic game information on a basic game image.

The additional element control unit 343 acquires track data from the game data stored in the memory unit 310 and analyzes the acquired track data. Then, the additional element control unit 343 determines the number of tracks to be included in the current game image and a direction of the track and whether to display the track according to the analyzed track data, and generates track information. That is, the number of tracks to be included in the game image and the direction of the track are designated by the track data included in the game data, and whether to display the track on the game image may also be designated in the track data.

In the present invention, the track is the element which designates a basic movement direction of the timing pointer in a state where the operation signal is not applied, and simultaneously, determines widths of the timing pointer and the input pointer. Further, the track provides a reference for determining whether the timing pointer is disposed at a position designated by the corresponding game data at the time at which the timing pointer reaches the timing determination line, thereby enabling the matching determination unit 350 to determine whether the timing pointer moves to the position at which the timing pointer matches the corresponding input pointer.

The additional element control unit 343 acquires timing determination line data from the game data and analyzes the acquired timing determination line data, determines a position and a size, with which the timing determination line is to be disposed on the game image, a size of the timing determination line, and whether to display the timing determination line according to the analyzed timing determination line data, and generates timing determination line information. The timing determination line is the line for displaying a reference position, which determines whether a timing pointer matches a corresponding input pointer on the game image, and a position at which the timing determination line is to be disposed may be variously adjusted, but in order to enable the user to intuitively progress the game, the timing determination line may be disposed at one end of the input pointer in the direction in which the timing pointer is disposed.

The additional element control unit 343 transmits the generated timing determination line information to the image configuring unit 320 to make the timing determination line be displayed on the game image, and also transmits the timing determination line information to the matching determination unit 350 to enable the matching determination unit 350 to determine the game progress state of the user.

When obstacle data is present in the game data, the additional element control unit 343 acquires and analyzes the obstacle data, determines a time and a position at which the obstacle is to appear on the game image during the progress of the game, and a size, a shape, and the like of the obstacle, and generates obstacle information. Herein, the obstacle, which is disposed in the movement path of the timing pointer moving in the direction of the timing determination line and is the target with which the timing pointer needs to avoid a collision, is a configuring element for improving the level of difficulty of the game. Accordingly, the additional element control unit 343 transmits the generated obstacle information to the image configuring unit 320 and the matching determination unit 350 to make the obstacle be displayed on the game image and make the matching determination unit 350 determine whether the timing pointer collides with the obstacle.

In the foregoing, the case where the additional element control unit 343 generates the track information, the timing determination line information, and the obstacle information has been described, but the track, the timing determination line, and the obstacle are omittable configuring elements in the timing determination-type game. That is, the additional element control unit 343 may also be excluded.

However, when the timing determination line is omitted, the input pointer may be set as a reference for determining a timing at which the timing pointer matches the corresponding input pointer, instead of the timing determination line, thereby enabling the matching determination unit 350 to determine the game progress state.

The matching determination unit 350 receives the timing pointer information, the input pointer information, the track information, the timing determination line information, and the obstacle information from the pointer control unit 340 and determines whether each timing pointer matches the corresponding input pointer at the time at which each timing pointer reaches the timing determination line, and whether the timing pointer collides with the obstacle while moving. Further, the matching determination unit 350 transmits the determination result to the image configuring unit 320 to make matching accuracy, a game score, penalty generation, and the like be displayed on the game image.

For convenience of the description, FIG. 2 illustrates that the matching determination unit 350 is separate from the pointer control unit 340, but the matching determination unit 350 may be included in the pointer control unit 340.

As described above, in the existing timing determination-type game, the user cannot operate the positions of the timing pointer and the input pointer, so that the user progresses the game by a scheme in which the user simply touches a position at a timing at which a timing pointer matches an input pointer. However, in the timing determination-type game apparatus according to the present invention, the user may progress the game by the scheme in which the pointer control unit 340 moves at least one of the timing pointer and the input pointer in the unit of the group in response to the operation signal applied from the input analyzing unit 330, and determines whether the moved timing pointer or input pointer is disposed at a position at which the moved timing pointer or input pointer matches the corresponding input pointer or timing pointer at a designated timing, and gives a point. Accordingly, the user may progress the game by a very different scheme from that of the existing game. That is, the users who are fed up with the existing timing determination-type game may also joyfully play the timing determination-type game of the present invention. Further, in the structure in which at least one of the timing pointer and the input pointer is moved in the unit of the timing pointer group or the input pointer group, even though the plurality of timing pointers and the plurality of input pointers are displayed, the user may progress the game even with a small number of operations, thereby causing no displeasure even though the level of difficulty of the game is raised.

Figure 3A:
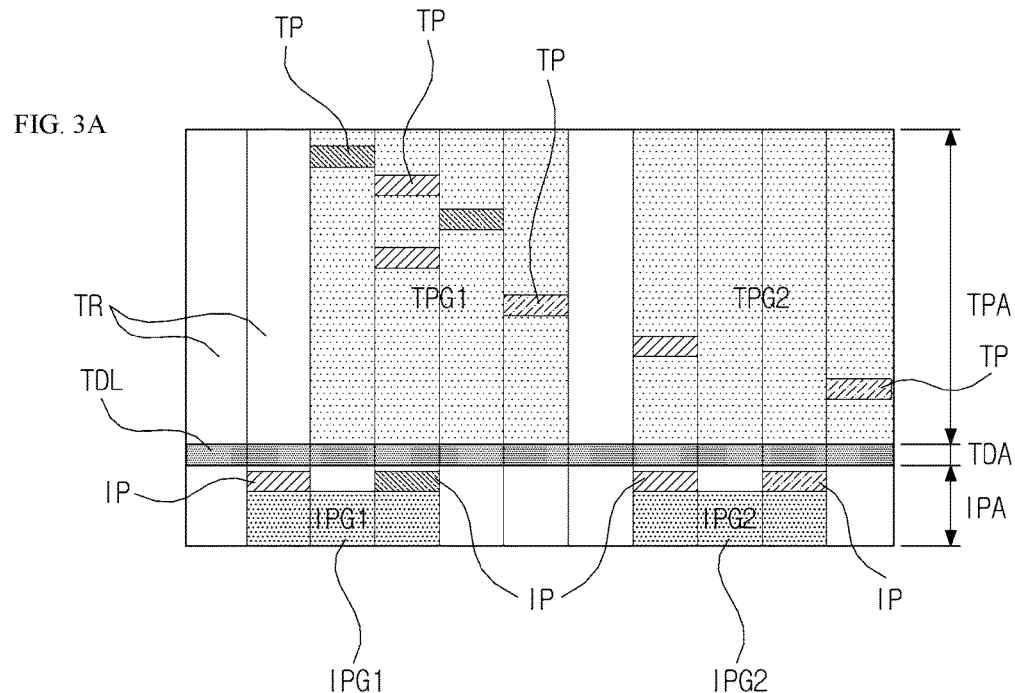
FIGS. 3A and 3B are diagrams illustrating an example of a game image for describing game configuring elements in a timing determination-type game of the present invention.
Figure 3B:
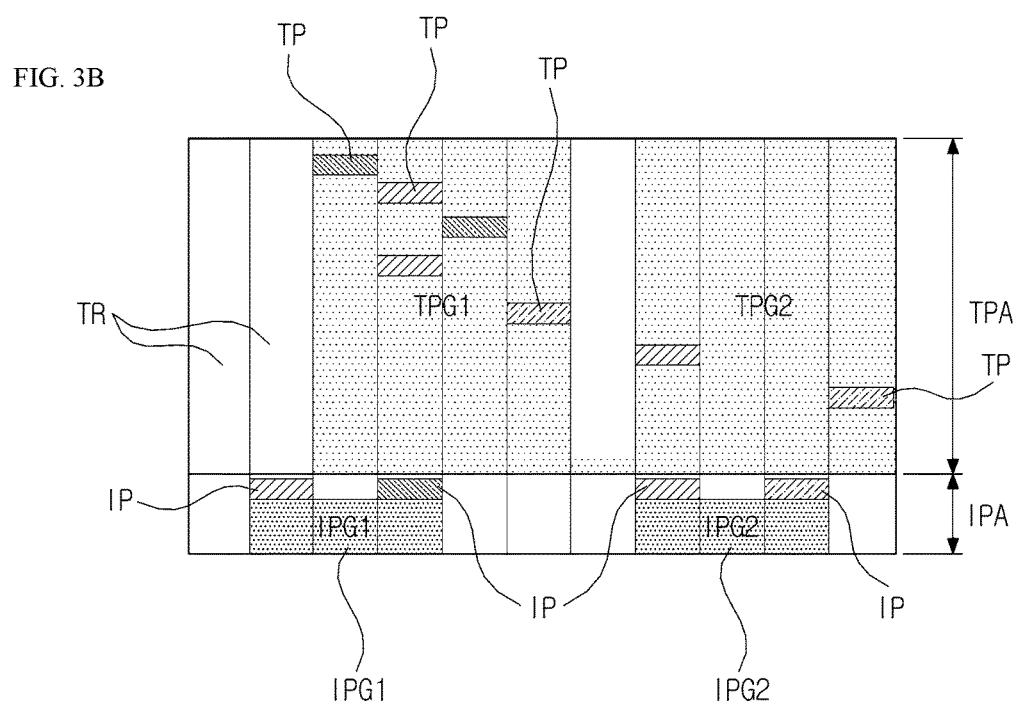

FIGS. 3A and 3B are diagrams illustrating an example of a game image for describing the game configuring elements in the timing determination-type game of the present invention.

FIG. 3A illustrates an example of a game image in which a timing determination line TDL is displayed, and FIG. 3B illustrates an example of a game image in which the timing determination line TDL is not displayed.

The game image illustrated in FIG. 3A will be described. The game image in the timing determination-type game of the present invention may be divided into three areas including a timing pointer area TPA, a timing determination line area TDA, and an input pointer area IPA as illustrated in the right side of the drawing.

A track TR is a movement path of the timing pointer TP and is a game configuring element for determining whether the timing pointer matches the input pointer at a designated position, and the track TR may be set to be displayed in all of the timing pointer area TPA, the timing determination line area TDA, and the input pointer area IPA or may be set to be displayed in at least one area of the three areas under the control of the additional element control unit 343.

The timing pointer area TPA is the area in which at least one timing pointer TP is displayed and moves under the control of the timing pointer control unit 341. Each of at least one timing pointer TP is displayed in the timing pointer area TPA at a time designated by the timing pointer data, and when an operation signal for the timing pointer is not applied from the input analyzing unit 330, the timing pointer TP moves in a direction of the input pointer area IPA along a designated path (herein, for example, the track TR). In this case, the timing pointer control unit 341 analyzes an attribute for each of at least one timing pointers TP included in the timing pointer data and generates timing pointer information so that the timing pointer TP is displayed on the game image in accordance with a color, a form, and a size of the timing pointer TP set in the attribute.

The timing pointer control unit 341 may designate a group identification form so that the user may visually discriminate the timing pointer group including the timing pointers TP. FIG. 3 illustrates the example in which a color is set as the group identification form, and since an area corresponding to the timing pointer group and the game background image may be easily identified, the user may easily recognize that two timing pointer groups TPG1 and TPG2 are disposed in the current game image. FIG. 3 illustrates that the group identification colors for the two timing pointer groups TPG1 and TPG2 are equally designated, but the group identification form, such as the group identification color, may be differently set for each group.

When the operation signal for the timing pointer is applied from the input analyzing unit 330, the timing pointer control unit 341 divides the timing pointers moving according to the timing pointer data in the unit of the group and moves the timing pointer in response to the operation signal. On an assumption that the interface unit is implemented by a touch screen in the timing determination-type game apparatus, when a touch and a drag of the user is applied to the touch screen as a user command, the input analyzing unit 330 outputs an operation signal corresponding to the touch and the drag. Further, in response to the operation signal, the timing pointer control unit 341 moves all of the timing pointers TP, which is included in the timing pointer group (for example, the first timing pointer group TPG1) in an area corresponding to a position at which the touch of the user is detected between the two timing pointer groups TPG1 and TPG2, in the drag direction. In this case, the timing pointer control unit 341 extracts a component parallel to the timing determination line TDL from the drag direction while maintaining a movement direction and a movement speed of the moving timing pointer TP designated by the timing pointer data, and additionally reflects the extracted component in the movement direction in the movement speed of all of the timing pointers TP included in the selected timing pointer group TPG1. That is, a movement vector of the timing pointer TP is acquired by summing a movement vector of the timing pointer TP designated by the timing pointer data and a movement vector of the timing pointer TP according to the operation signal.

Herein, the timing pointer groups TPG1 and TPG2 may also be set to move in the unit of a pixel or the track TR on the game image when moving the direction parallel to the timing determination line, and may also be controlled to move according to a separately set movement unit.

The timing determination line area TDA is the area displayed under the control of the additional element control unit 343, and is a boundary area for discriminating the timing pointer area TPA and the input pointer area IPA and is the area for determining whether the timing pointer TP reaches the position designated by the corresponding input pointer TP at the designated timing. For example, in FIG. 3, the timing pointer TP positioned at the right side in the second timing pointer group TPG2 needs to be operated to move by one track to the left until reaching the timing determination line area TDA.

As described above, in the timing determination-type game of the present invention, the timing determination line TDL may not be displayed on the game image. Accordingly, FIG. 3B illustrating the example of the game image in which the timing determination line TDL is not displayed represents that the input pointer may be set as a reference for determining a timing at which the timing pointer matches the corresponding input pointer, instead of the timing determination line.

The matching determination unit 350 determines a progress state of the game by determining whether the timing pointer TP is positioned on the same track as that of the corresponding input pointer IP at the timing at which the timing pointer TP reaches the timing determination line TDL. However, as described above, the timing determination line TDL may be omitted from in the game image, and in this case, a boundary between the input pointer area IPA and the timing pointer area TPA or a partial upper area of the input pointer may be utilized, instead of the timing determination line TDL.

When the timing pointer TP or the input pointer IP moves in the unit of the track, the matching determination unit 350 may determine whether the timing pointer TP and the input pointer IP corresponding to the timing pointer TP are disposed in the same track TR and determine whether the timing pointer TP matches the input pointer IP corresponding to the timing pointer TP. However, when the timing pointer TP or the input pointer IP moves in the unit of the pixel or based on another movement unit, not the unit of the track, it is difficult for the user to move the timing pointer TP or the input pointer IP to be accurately included within the range of the track. Accordingly, when the movement unit of the timing pointer TP or the input pointer IP is not the track, the matching determination unit 350 may analyze whether a ratio of the area in which the timing pointer TP matches the corresponding input pointer IP is equal to or larger than a pre-designated reference matching ratio and determine whether the timing pointer TP matches the corresponding input pointer IP. For example, on an assumption that the reference matching ratio is set to 50%, only when the timing pointer TP and the corresponding input pointer IP overlap in an area of 50% or more, the matching determination unit 350 may determine that the timing pointer TP matches the corresponding input pointer IP. In another method, even when a track on which a center point of the form in which the timing pointer is displayed is positioned is recognized as the track on which the timing pointer is currently disposed, the matching determination unit 350 may determine whether the timing pointer TP matches the corresponding input pointer IP, in the same manner as in the case where the reference matching ratio is set to 50%.

The input pointer area IPA is the area in which at least one input pointer IP is displayed under the control of the input pointer control unit 342, and moves in response to the operation signal. Each of at least one input pointer is displayed in the input pointer area IPA at a time designated by the input pointer data, and when the operation signal for the input pointer is not applied from the input analyzing unit 330, the input pointer IP is maintained in the initially displayed area for the designated time as it is.

The input pointer control unit 342 may analyze an attribute of each of at least one input pointer IP included in the input pointer data, and generate timing pointer information so that the input pointer is displayed with a color, a form, and a size of the input pointer IP set as the attribute, and when input pointer groups IPG1 and IPG2 are set, the input pointer control unit 342 may designate a group identification form so as to easily discriminate the input pointer groups and include the designated group identification form in the timing pointer information.

The input pointer control unit 342 may control the input pointer IP to move in response to the operation signal according to the attribute of the input pointer of the input pointer data, or control the input pointer IP to be maintained at a fixed position regardless of the operation signal. When the input pointer control unit 342 controls the input pointer IP to move in response to the operation signal, the input pointer control unit 342 may control the input pointer IP to move in the unit of the group, similar to the timing pointer TP moving in the unit of the group. In this case, the input pointer IP moving in the unit of the group may move by an extracted parallel component in response to the operation signal corresponding to the touch and the drag for the input pointer area IPA by extracting a component parallel to the timing determination line TDL from the drag direction.

FIGS. 4A to 4D are diagrams illustrating examples of various forms of displaying an input pointer track group.

FIG. 4 illustrates the game image in which the timing determination line TDL is not displayed as illustrated in FIG. 3B, and as described above, a color, a form, and the like of the input pointer IP in the input pointer area IPA may be variously set according to the attribute included in the input pointer data, and attributes for the input pointer groups IPG1 and IPG2 may also be set in various forms.

Figure 4A:
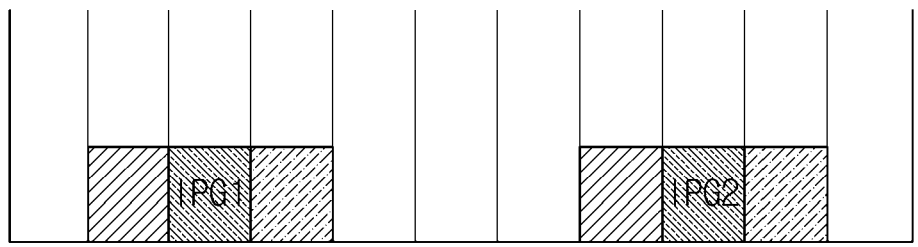
FIGS. 4A to 4D are diagrams illustrating examples of various forms displaying an input pointer track group.

FIG. 4A illustrates the form in which the attributes of the input pointer IP and the input pointer groups IPG1 and IPG2 are set to be identical to those of FIG. 3, so that the attributes of the input pointer IP and the input pointer groups IPG1 and IPG2 are displayed in the divided areas. Particularly, in FIG. 4A, in order for the user to more accurately recognize the position of the track TR, the tracks TR are divided and displayed even in the areas in which the attributes of the input pointer groups IPG1 and IPG2 are displayed, as well as the area in which the input pointer IP is displayed.

Figure 4B:
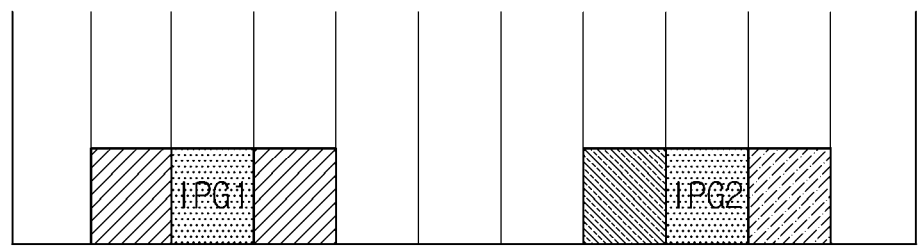

FIG. 4B illustrates the form in which the attributes of the input pointer IP and the input pointer groups IPG1 and IPG2 are displayed in the divided areas, similar to FIG. 4A, but the track TR is not displayed in the areas in which the input pointer groups IPG1 and IPG2 are displayed, thereby enabling the user to more easily discriminate the input pointer groups IPG1 and IPG2.

Figure 4C:
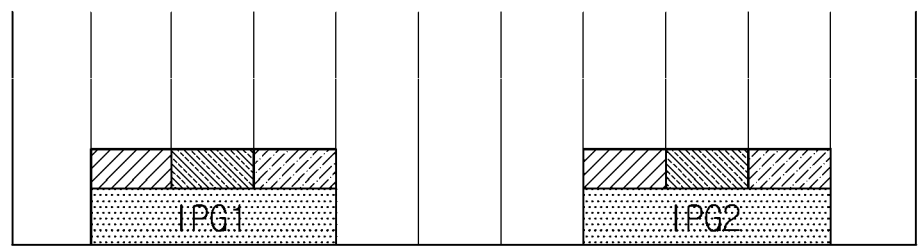
Figure 4D:
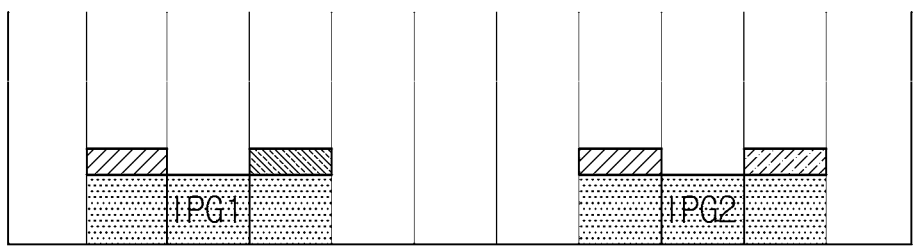

Unlike FIGS. 4A and 4B, in FIGS. 4C and 4D, the attributes of the input pointer IP and the input pointer groups IPG1 and IPG2 are displayed without being divided. Instead, in FIG. 4C, the input pointer groups IPG1 and IPG2 are disposed so as to be spaced apart from each other, and the input pointers IP included in each of the input pointer groups IPG1 and IPG2 are continuously disposed, thereby enabling the user to discriminate the input pointer groups IPG1 and IPG2. Further, in FIG. 4D, when the input pointers IP included in each of the input pointer groups IPG1 and IPG2 are not continuously disposed, the attributes of the input pointer groups IPG1 and IPG2 are displayed in the area in which the input pointers IP are not disposed, thereby enabling the user to recognize the input pointer groups IPG1 and IPG2.

Figure 5A:
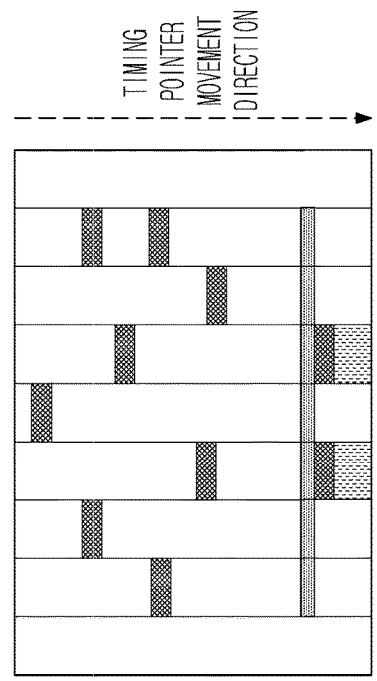
FIGS. 5A to 5D are diagrams illustrating a disposition structure of a timing pointer region, a timing determination region, and an input pointer region, and a movement direction of a timing pointer according to a track according to various exemplary embodiments in the timing determination-type game of the present invention.
Figure 5B:
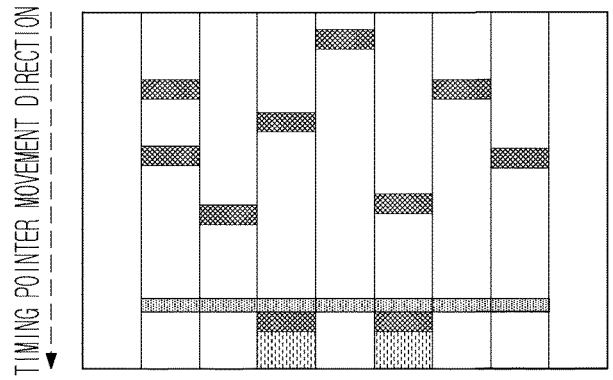
Figure 5C:
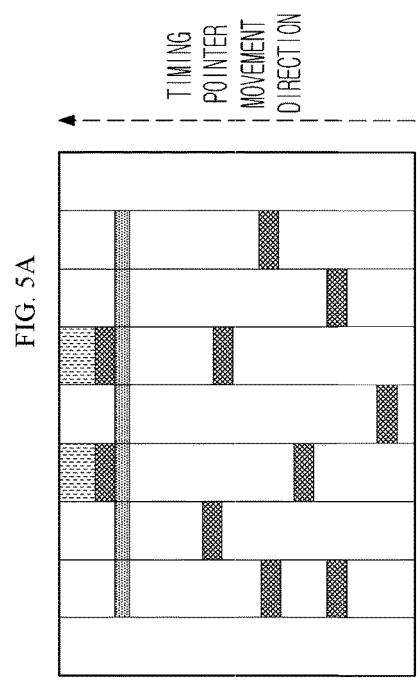
Figure 5D:
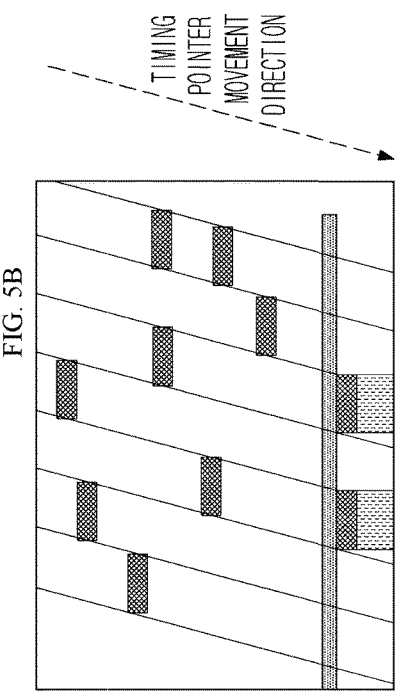

FIGS. 5A and 5D are diagrams illustrating a disposition structure of a timing pointer region, a timing determination region, an input pointer region, and a movement direction of a timing pointer according to a track according to various exemplary embodiments in timing determination-type game of the present invention.

FIG. 5A illustrates the form in which the timing pointers descend and move from an upper end of the game image in a vertical direction in which the input pointers and the timing determination line are disposed, as the most general timing determination-type game progress scheme. FIGS. 5B and 5C illustrate the form in which the game image rotates 90° and 180°, respectively, and illustrate the form in which the timing pointers appear from a right end of the game image and move to positions in which the input pointers and the timing determination line are disposed, in a vertical direction, and the form in which the timing pointers appear from a lower end of the game image and move to positions in which the input pointer and the timing determination line are disposed, in a horizontal direction, respectively.

In FIG. 5D, the timing pointers appear from the upper end of the game image, similar to FIG. 5A, but unlike FIGS. 5A to 5C, the timing pointers move in a diagonal direction in the game image along the track TR formed in a diagonal direction in the game image and move to a position in which the input pointers and the timing determination line are disposed.

As illustrated in FIG. 5D, when the track is generated in the form, not the vertical or horizontal form, in the game image, a movement path of the timing pointer recognized by the user is different from those of FIGS. 5A to 5C, thereby raising the level of difficulty of the game by a very simple scheme.

Figure 6A:
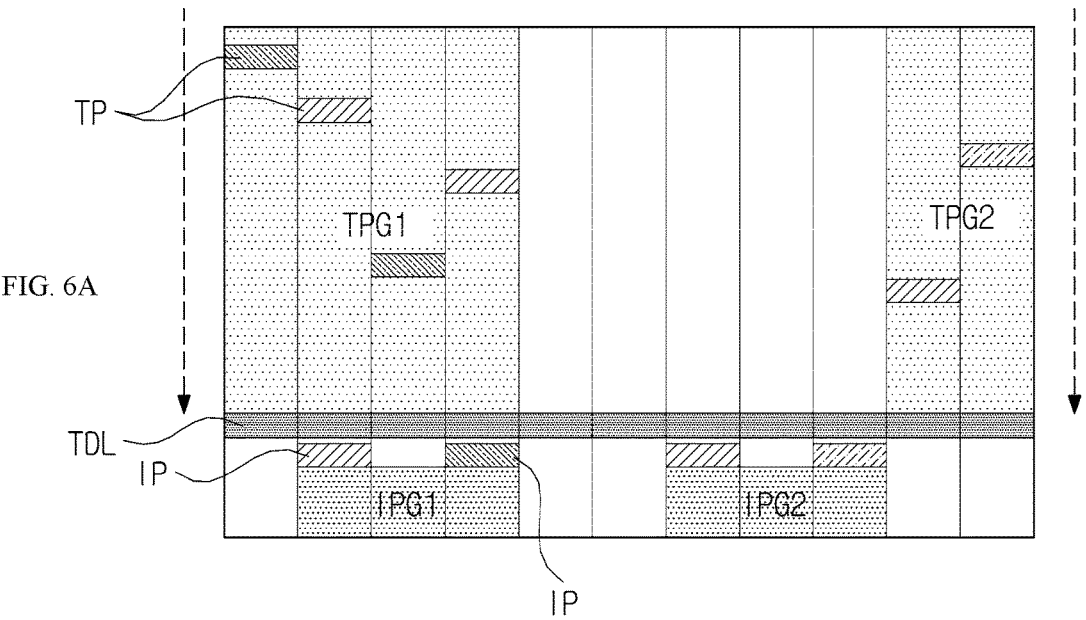
FIGS. 6A and 6B are diagrams illustrating examples of a movement of a timing pointer group in the unit of a track.
Figure 6B:
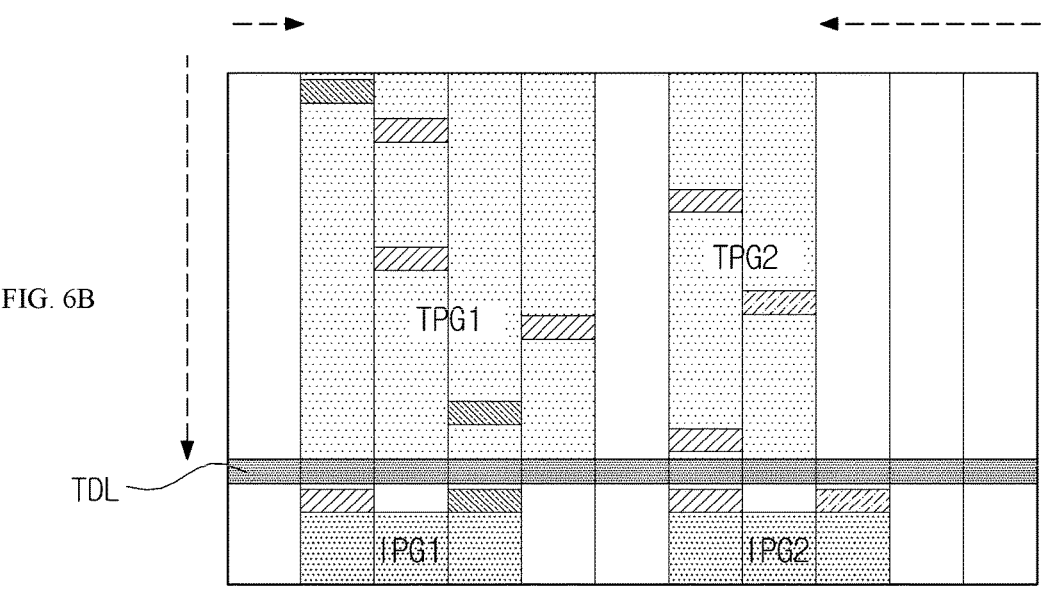

FIGS. 6A and 6B are diagrams illustrating examples of a movement of the timing pointer group in the unit of the track.

FIG. 6A illustrates the state where the timing pointer groups TPG1 and TPG2 move in the direction of the timing determination line in the state where an operation signal is not applied, and illustrates the case where the timing pointers move in the same direction as that of FIG. 5A. In FIG. 6A, since the operation signal is not applied, all of the timing pointers of each of the two timing pointer groups TPG1 and TPG2 vertically move in the direction in which the timing determination line TDL is disposed. Accordingly, in FIG. 6A, two timing pointers disposed at the lowermost end among the timing pointers of the two timing pointer groups TPG1 and TPG2 reach first the timing determination line. However, the two timing pointers disposed at the lowermost end among the timing pointers of the two timing pointer groups TPG1 and TPG2 are disposed on different tracks from the tracks on which the corresponding input pointers among the input pointers of the input pointer groups IPG1 and IPG2 are disposed. In FIG. 6A, it can be seen that the input pointer corresponding to the lowermost-end timing pointer of the first timing pointer group TPG1 is disposed at the right side of the first track, and the input pointer corresponding to the lowermost-end timing pointer of the second timing pointer group TPG2 is disposed at the right side of the third track. Accordingly, the command input unit 100 receives a user command of the user playing the game and transmits the received user command to the input analyzing unit 330 of the game control unit 300, and the input analyzing unit 330 applies an operation signal corresponding to the user command to the timing pointer control unit 341 of the pointer control unit 340, thereby enabling the timing pointers of the two timing pointer groups TPG1 and TPG2 to move across the tracks TR. However, in FIG. 6, since the case where the timing pointer is set to move in the unit of the track TR by the timing pointer data is assumed, each of the timing pointers cannot be disposed between the tracks TR, and accordingly, as illustrated in FIG. 6B, it can be seen that the plurality of timing pointers is disposed in the areas divided by the tracks TR.

The timing pointers are controlled to still move from an upper end of the game image in the vertical direction even while moving across the tracks TR and the time designated by the timing pointer data is maintained without a change as the time at which each of the timing pointers reaches the timing determination line TDL.

As illustrated in FIG. 6, the case where the timing pointers are configured to move in the unit of the track may be applied as a method for improving operation convenience of the user when an input means configuring the command input unit 100 is implemented by a button, a joystick, a keyboard, and the like which are difficult to be precisely adjusted.

Figure 7A:
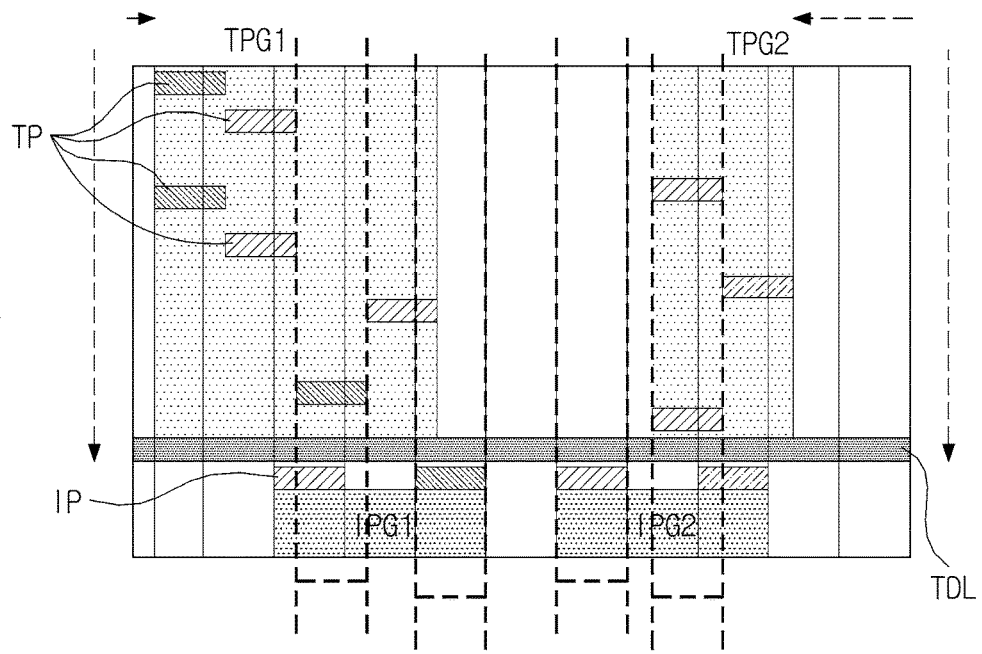
FIGS. 7A and 7B are diagrams illustrating examples of a movement of a timing pointer group in the unit of a pixel.
Figure 7B:
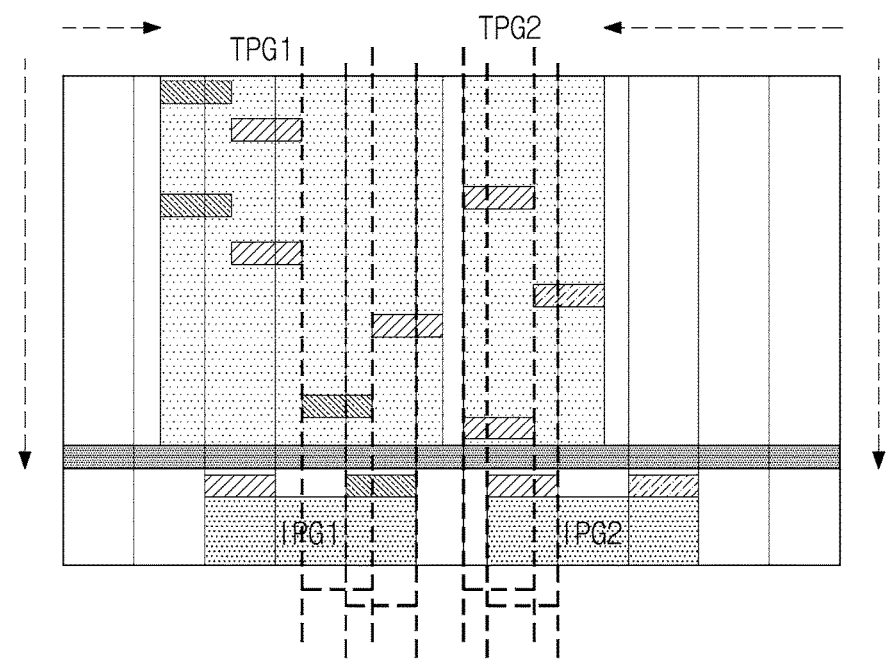
Figure 8A:
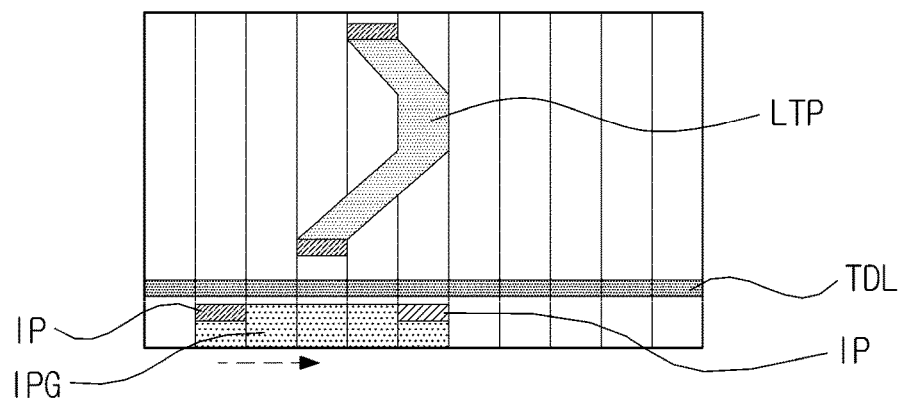
FIGS. 8A to 9D are diagrams illustrating examples of game methods for a long-note type timing pointer.
Figure 8B:
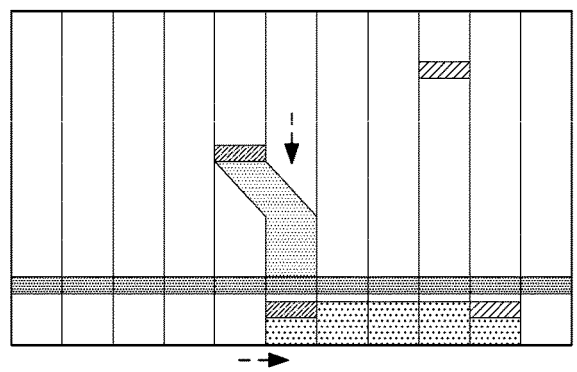
Figure 8C:
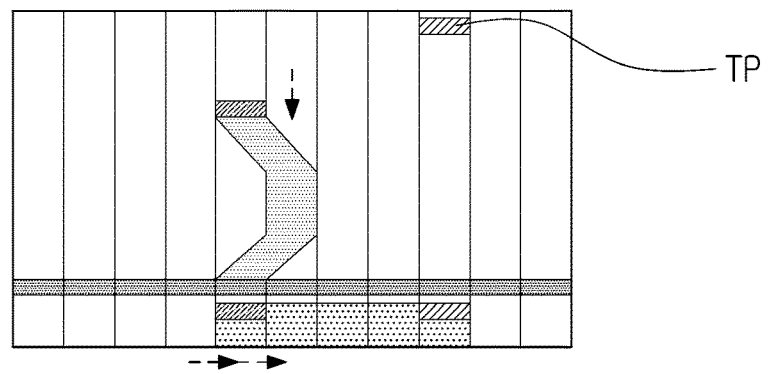
Figure 8D:
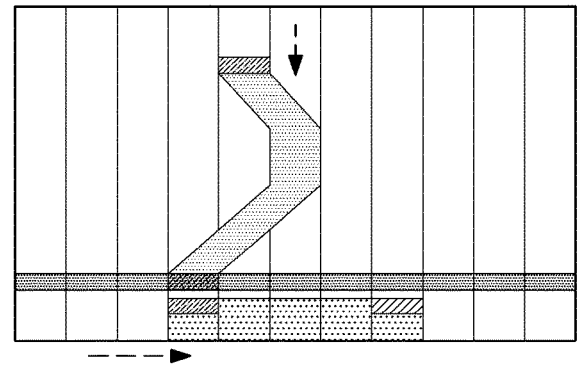
Figure 9A:
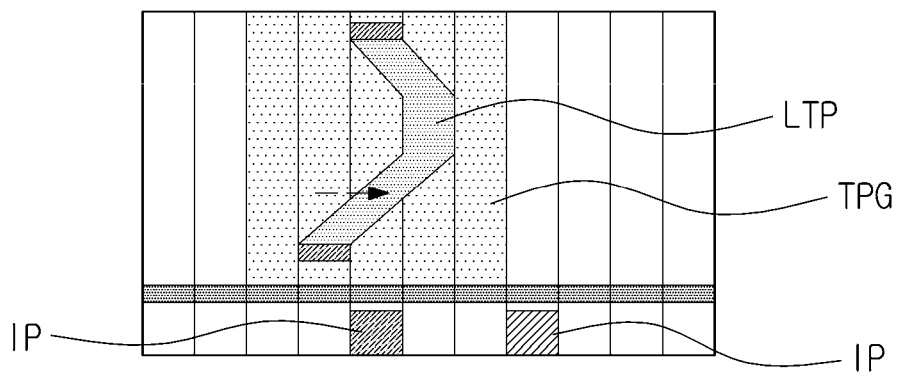
Figure 9B:
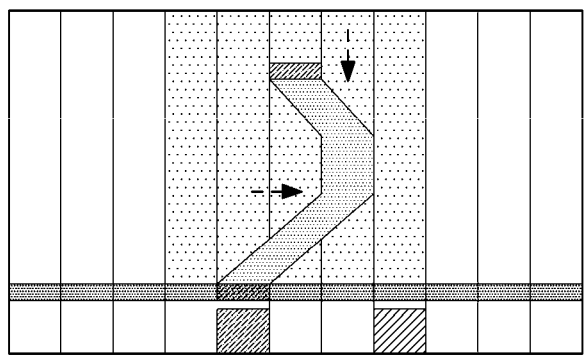
Figure 9C:
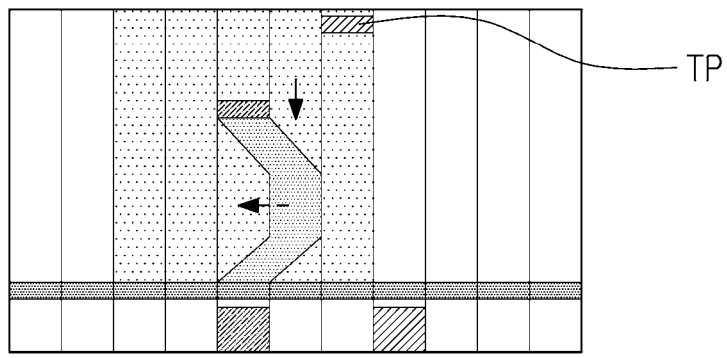
Figure 9D:
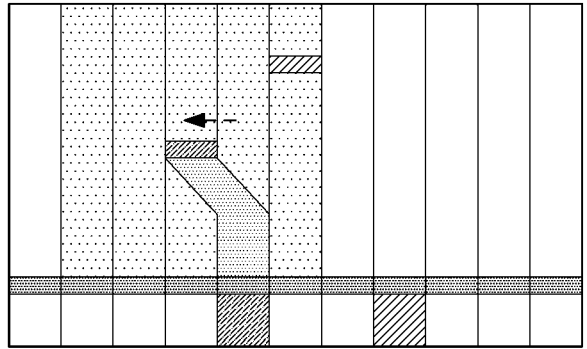

FIGS. 7A and 7B are diagrams illustrating examples of a movement of the timing pointer group in the unit of a pixel.

In FIGS. 7A and 7B, the timing pointer group is configured to move in the unit of the pixel, so that as illustrated in FIGS. 7A and 7B, the plurality of timing pointers may be disposed over the boundary line of the tracks TR, and the amount of movement by which the timing pointer may move in response to the operation signal may be variously adjusted. Particularly, the movement speeds of the timing pointers may be controlled to be varied in response to the user command.

In the foregoing, it is illustrated that the timing pointer groups TPG1 and TPG2 move in response to the operation signal and the input pointer groups IPG1 and IPG2 do not move, but the input pointer groups IPG1 and IPG2 may also be set to move in response to the operation signal.

In the foregoing, it is described that the timing pointers of each of the two timing pointer groups TPG1 and TPG2 match the corresponding input pointers within the corresponding input indictor groups IPG1 and IPG2, but the movement of the timing pointers of each of the timing pointer groups TPG1 and TPG2 according to the operation signal is simply performed in the unit of the group, and the corresponding input pointers may be set not to be included in the specific input pointer group.

That is, the timing pointers included in each of the timing pointer groups TPG1 and TPG2 may also be set to match the input pointers having the input pointer attributes corresponding to the timing pointer attributes, respectively, regardless of the attributes of the timing pointer groups TPG1 and TPG2 or the attributes of the input pointer groups IPG1 and IPG2. In this case, the timing pointers of the first timing pointer group TPG1 may also be set to match the input pointers of the second input pointer group IPG2. Whether the timing pointer matches the input pointer based on the group attribute of the timing pointer group or the input pointer group may be preset and stored in the game data, or may be set to be changed by the user, as a game option.

FIGS. 8A to 9D are diagrams illustrating examples of game methods for a long-note type timing pointer.

Long-note type timing pointers illustrated in FIGS. 8 and 9 are also referred to as continuous timing pointers, and have forms in which the timing pointers continuously overlap, and as illustrated in FIGS. 8A to 8D and FIGS. 9A to 9D, when one end of the long-note type timing pointer matches a corresponding input pointer, the matching needs to be continuously maintained while a line of the long-note type timing pointer maintains thereafter.

Then, the matching of a long-note type timing pointer LTP, which moves according to the time, with the corresponding input pointer needs to be maintained until a portion of the long-note type timing pointer LTP overlapping the timing determination line TDL or the input pointer IP disappears, and a final area of the long-note type timing pointer LTP disappears. When the matching state of the long-note type timing pointer LTP and the input pointer IP is released before the long-note type timing pointer LTP completely disappears, the matching determination unit 350 may set points not to be given or to be subtracted.

All of FIGS. 8A to 9D illustrate the game methods for the long-note type timing pointer LTP, but FIGS. 8A to 8D illustrate the case where the input pointer group IPG moves in response to the operation signal, and FIGS. 9A to 9D illustrate the case where the timing pointer group TPG including the long-note type timing pointer LTP moves in response to the operation signal.

Figure 10A:
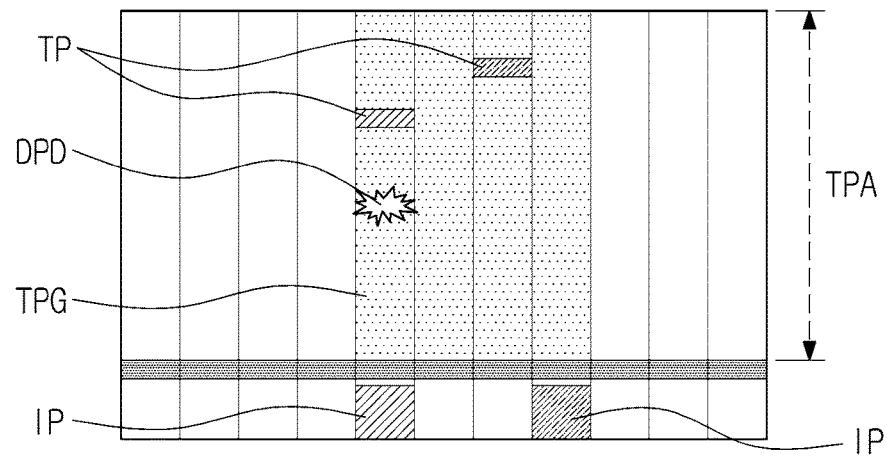
FIGS. 10A to 10C are diagrams illustrating an example of a game method for an obstacle.
Figure 10B:
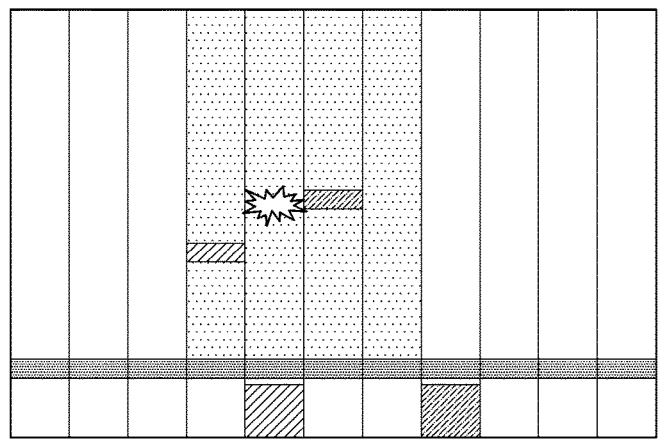
Figure 10C:
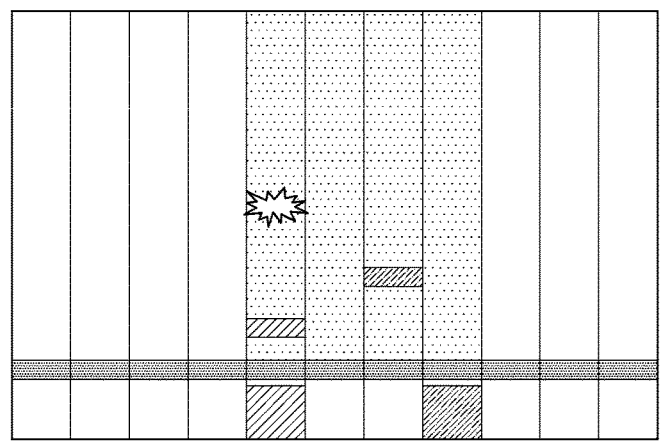

FIGS. 10A to 10C illustrate an example of a game method for an obstacle.

As described above, an obstacle DPD is a game configuring element included in the game image by analyzing, by the additional element control unit 343 of the pointer control unit 340, obstacle data in the game data and transmitting generated obstacle information to the image configuring unit 320. When the obstacle DPD is displayed in the timing pointer area TPA in which the timing pointer TP moves, such that the timing pointer TP collides with the obstacle DPD while moving, the matching determination unit 350 may set points not to be given or be subtracted.

Accordingly, when the obstacle DPD is displayed on the game image, the user may progress the game by applying a user command and moving the timing pointer TP to a position at which the timing pointer TP may avoid the obstacle DPD. In the present invention, since all of the timing pointers TP included in the timing pointer group TPG simultaneously move, as illustrated in FIGS. 10A to 10C, the user needs to operate the timing pointers so that all of the timing pointers TP included in the timing pointer group TPG avoid the collisions with the obstacle DPD, not that only one timing pointer TP avoids a collision with the obstacle DPD. That is, it is possible to simply raise the level of difficulty of the game compared to the case where each of the timing pointers is individually operated.

Figure 11B:
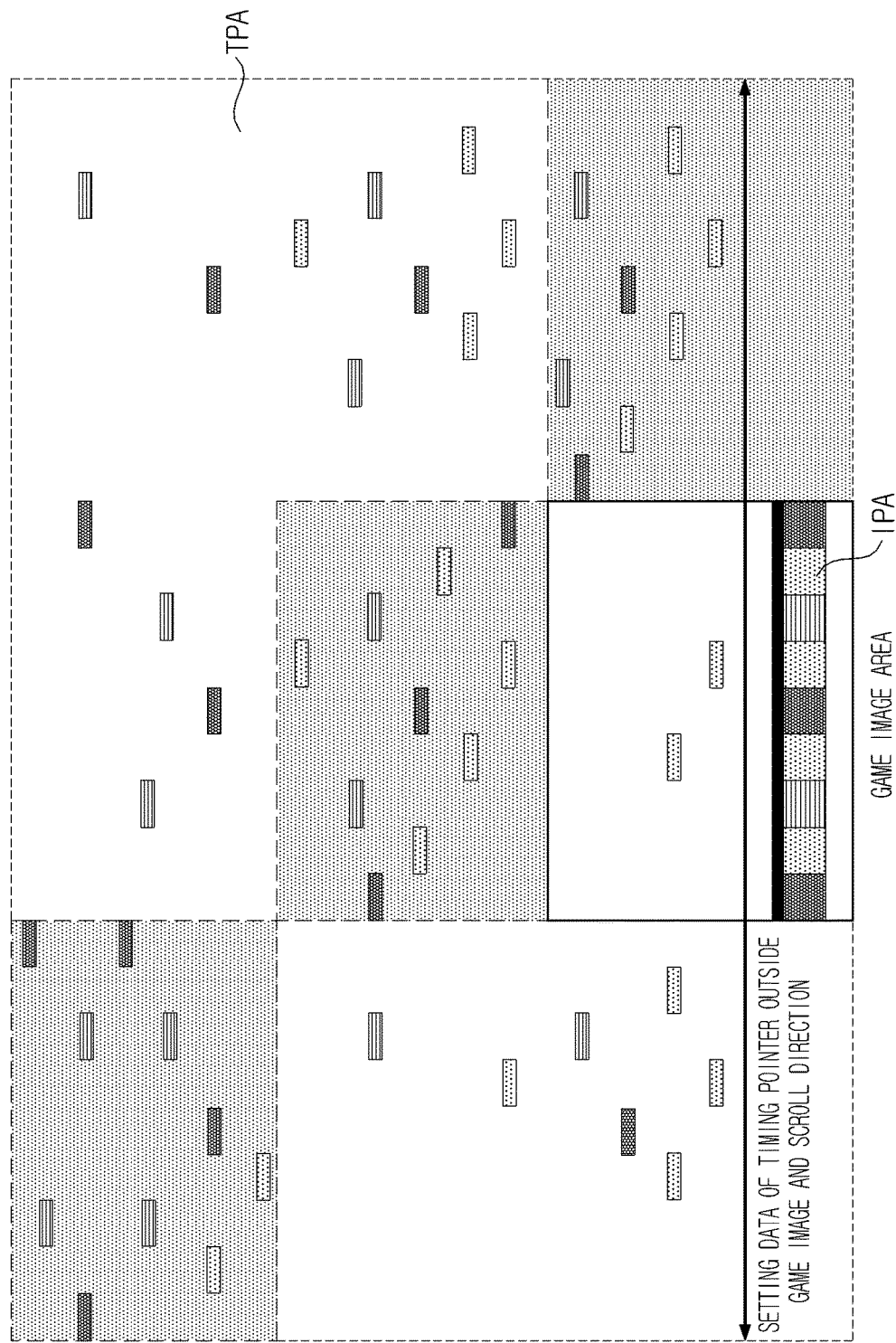
Figure 11C:
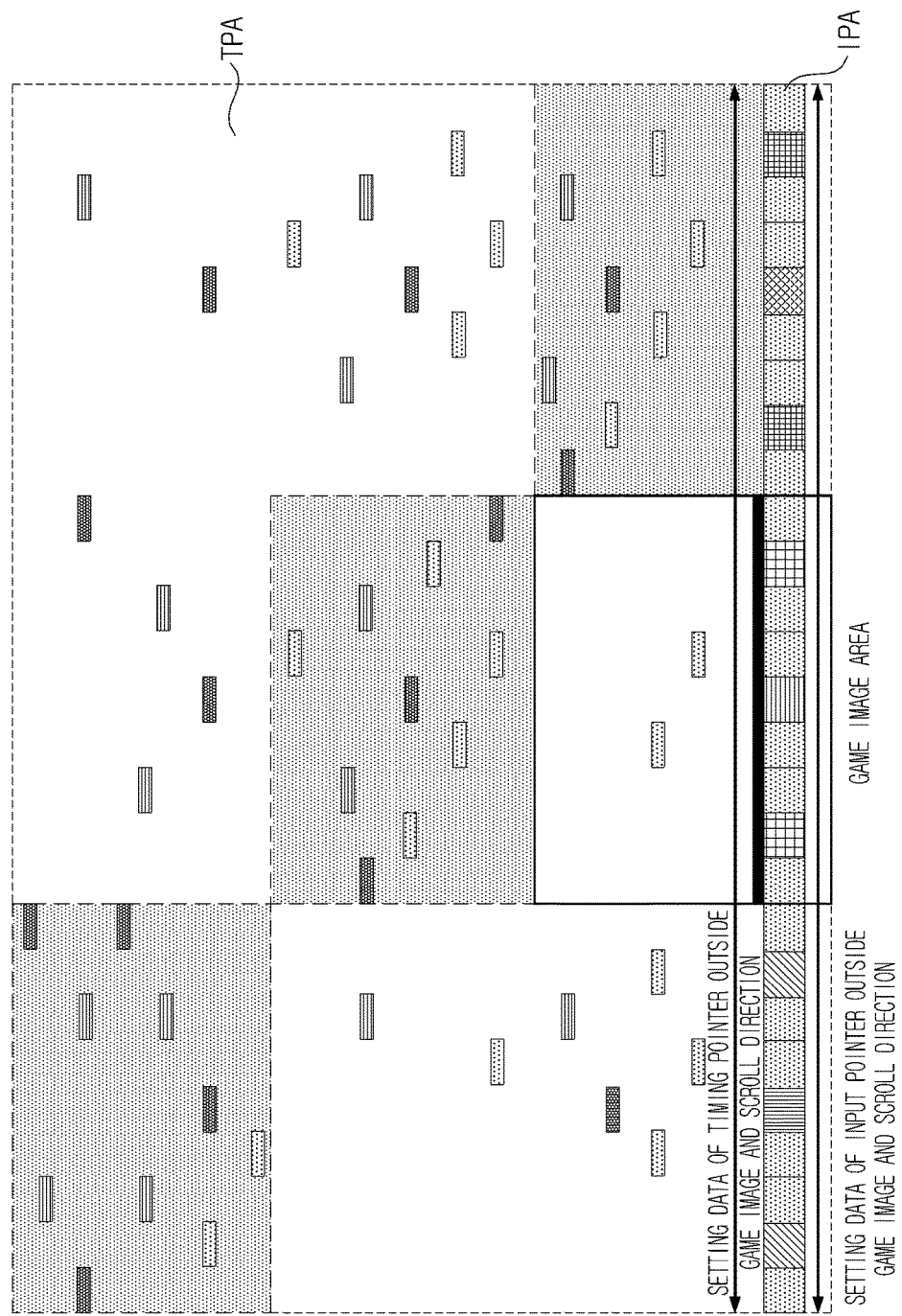

FIGS. 11A to 11C are diagrams illustrating scroll regions of the timing determination-type game of the present invention.

FIG. 11A illustrates the case where a scroll region is set in an input pointer group, and FIG. 11B illustrates the case where a scroll region is set in a timing pointer group. Further, FIG. 11C illustrates the case where scroll regions are set in both the input pointer group and the timing pointer group.

In the foregoing, it is described that the input pointer IP of at least one input pointer group IPG corresponding to at least one timing pointer TP included in at least one timing pointer group TPG displayed in the timing pointer area TPA is displayed in the input pointer area IPA. However, in this case, there is a limit in that the input pointer IP having the attribute corresponding to the attribute for discriminating at least one timing pointers TP needs to be displayed in the input pointer area IPA, so that actually, there is a limit in variously setting the attribute for visually discriminating at least one timing pointer TP and the at least one corresponding input pointer IP.

Accordingly, in FIG. 11A, the input pointer control unit 342 of the pointer control unit 340 displays only one input pointer group IPG in the input pointer area IPA. However, as can be seen in FIG. 11A, the input pointer control unit 342 may set a width of the input pointer area IPA to be larger than a width of the game image without being limited to a size of the currently displayed game image, and display the input pointer group IPG including the plurality of input pointers IP having the different attributes in the input pointer area IPA that is set to have the larger width than the width of the game image. Then, when the input pointer control unit 342 scrolls at least one input pointer IP, which is to be displayed on the game image among the plurality of input pointers IP of the input pointer group IPG displayed in the input pointer area IPA that is set to be larger than the game image, within the input pointer area IPA in response to the operation signal, thereby enabling the input pointer IP, which is not displayed in the current game image, to be displayed on the game image and the input pointer IP to match a corresponding timing pointer TP moving along a designated movement path. In this case, the timing pointer control unit 341 may also display the plurality of timing pointer groups TPG1 to TPG3, but the plurality of timing pointer groups TPG1 to TPG3 may be configured to sequentially move in the direction of the input pointer area IPA.

In the meantime, in FIG. 11B, the timing pointer control unit 341 sets a width of the timing pointer area TPA to be larger than the width of the game image and displays the timing pointer group TPG including the plurality of timing pointers IP in the timing pointer area TPA that is set to have the larger width than the width of the game image. Then, the timing pointer control unit 341 scrolls at least one timing pointer TP, which is to be displayed on the game image among the plurality of timing pointers TP of the timing pointer group TPG displayed in the timing pointer area TPA that is set to be larger than the game image, within the timing pointer area TPA in response to the operation signal, thereby enabling the timing pointer TP, which is not displayed in the current game image, to be displayed on the game image and the corresponding timing pointer TP moving a designated movement path to match a corresponding input pointer IP fixed at a designated position of the input pointer area IPA.

FIG. 11C illustrates the form in which the widths of both the input pointer area IPA and the timing pointer area TPA are set to be larger than a width of the game image, and a user scrolls at least one of the input pointer group IPG and the timing pointer group TPG in a direction different from a movement path of the timing pointer, thereby enabling a timing pointer TP or an input pointer area IPA, which is not displayed on the current game image, to be displayed on the game image.

In FIGS. 11A to 11C, when the user scrolls the timing pointer TP or the input pointer IP, or the timing pointer group TPG or the input pointer group IPG, which is not displayed on the current game image in the direction different from the movement path of the timing pointer, thereby enabling the timing pointer TP or the input pointer IP, or the timing pointer group TPG or the input pointer group IPG to be displayed on the game image, and the timing pointer TP and the input pointer IP corresponding to each other to match. In this case, the user performs the scroll so as to configure the game image in which the timing pointer TP and the input pointer IP are displayed for acquiring higher points, thereby increasing the level of difficulty of the game and increasing interests in the game.

Figure 12:
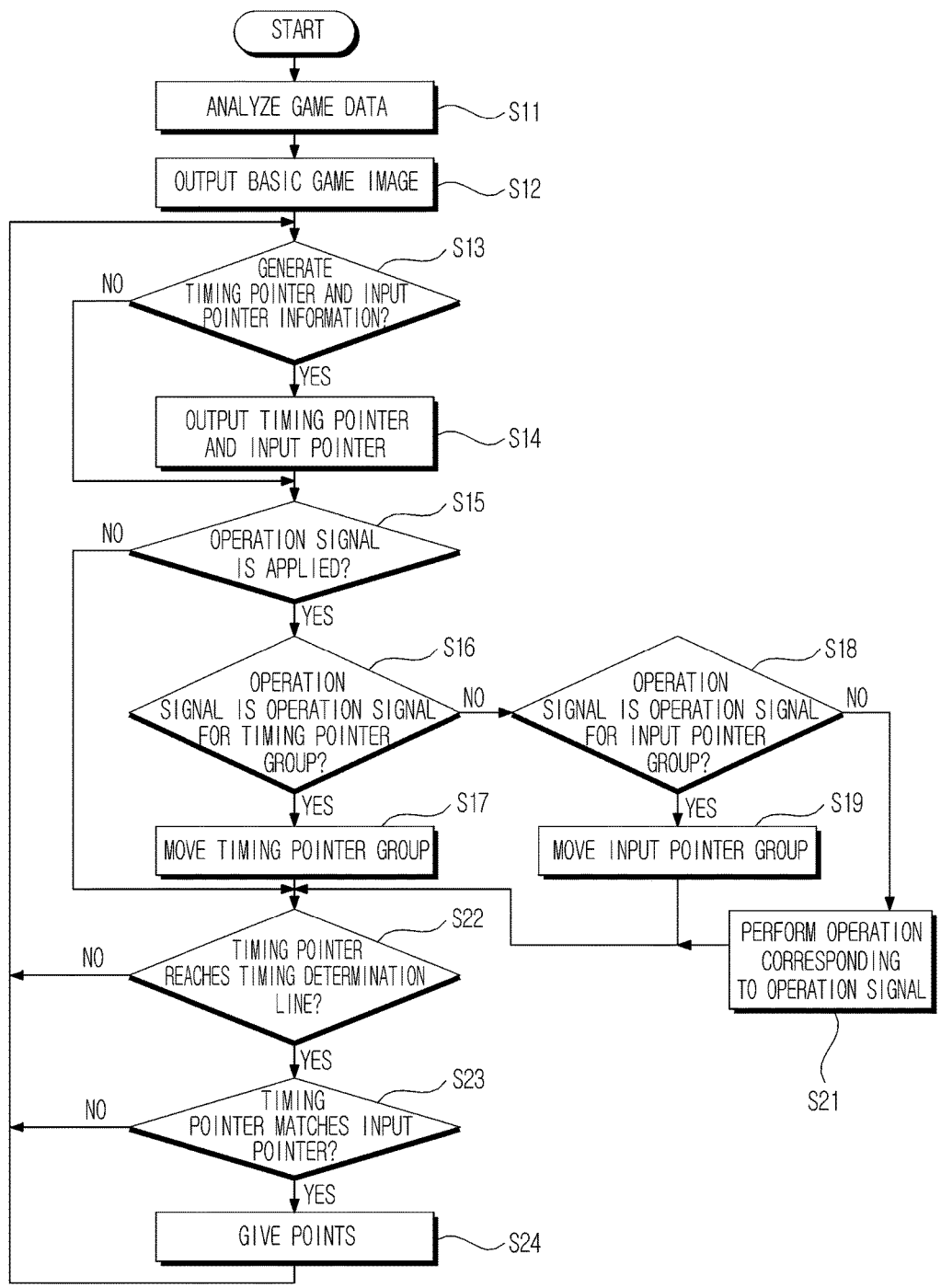
FIG. 12 is a diagram illustrating a timing determination-type game method according to an exemplary embodiment of the present invention.

FIG. 12 illustrates a timing determination-type game method according to an exemplary embodiment of the present invention.

A timing determination-type game method of the present invention will be described with reference to FIGS. 2 to 11C. First, the pointer control unit 340 of the game control unit 300 acquires game data stored in the memory unit 310 and analyzes the acquired game data (S11). The additional element control unit 343 of the pointer control unit 340 first analyzes basic game data in the game data, generates basic game information for basic configuring elements, such as a background image and a menu, for progressing the game, and transmits the generated basic game information to the image configuring unit 320 to make a basic game image be output through the image output unit 200 (S12).

The timing pointer control unit 341 and the input pointer control unit 342 of the pointer control unit 340 analyze timing pointer data and input pointer data included in the game data and determine whether to generate timing pointer information and input pointer information for outputting timing pointers and input pointers on the game image (S13). The timing pointer data and the input pointer data include information about a time, a position, and the like at which the timing pointer and the input pointer are to be output while the game progresses, and the timing pointer control unit 341 and the input pointer control unit 342 generate the timing pointer information and the input pointer information at a time designated so as to output the timing pointer and the input pointer according to the analyzed timing pointer data and input pointer data and transmit the generated timing pointer information and input pointer information to the image configuring unit 320 (S14).

The timing pointer control unit 341 and the input indictor control unit 342 determine whether an operation signal is applied from the input analyzing unit 330 (S15). When the operation signal is applied, the timing pointer control unit 341 determines whether the operation signal is the operation signal for a timing pointer group (S16). When it is determined that the operation signal is the operation signal for the timing pointer group, the timing pointer control unit 341 moves the timing pointer group in response to the operation signal (S17).

However, when it is determined that the operation signal is not the operation signal for the timing pointer group, the input pointer control unit 342 determines whether the operation signal is the operation signal for an input pointer group (S18). Then, when it is determined that the operation signal is the operation signal for the input pointer group, the input pointer control unit 342 moves the input pointer group in response to the operation signal (S19).

In the timing determination-type game according to the present invention, the timing pointers and the input pointers do not individually move in response to the operation signal, but move in the unit of the group, such as the timing pointer group including at least one timing pointer and the input pointer group including at least one input pointer. In this case, the timing pointer group and the input pointer group move in a direction (a direction parallel to the timing determination line) that is across the track in response to the operation signal.

By moving the timing pointer and the input pointer in the unit of the group as described above, it is possible to simultaneously and collectively move the plurality of input pointers and the plurality of timing pointers, thereby improving operation convenience of the user and variously adjusting the level of difficulty of the game. However, even though the operation signal is not applied, the timing pointer gradually moves from an initial position in the direction in which the input pointer is disposed, and even when the operation signal is applied, a speed of the timing pointer moving in the direction of the input pointer is maintained. That is, a time at which each timing pointer reaches the timing determination line is the same regardless of the application of the operation signal.

In the meantime, when it is determined that the operation signal is not the operation signal for the input pointer group, the game control unit 300 performs a predetermined operation corresponding to the operation signal (S21).

Then, the matching determination unit 350 determines whether each of at least one timing pointer reaches the timing determination line (S22). When it is determined that at least one timing pointer reaches the timing determination line, the matching determination unit 350 determines whether a position of the timing pointer reaching the timing determination line matches a position of the corresponding input pointer (S23). That is, the matching determination unit 350 determines whether the position of the timing pointer reaching the timing determination line and the position of the corresponding input pointer are the same track. When it is determined that the position of the timing pointer reaching the timing determination line and the position of the corresponding input pointer are the same track, the matching determination unit 350 gives a point (S24). However, when it is determined that the position of the timing pointer reaching the timing determination line and the position of the corresponding input pointer are not the same track, the matching determination unit 350 does not give a point. Depending on a case, the matching determination unit 350 may set points not to be given and to be subtracted as a penalty.

In the meantime, although not illustrated in FIG. 12, after the timing pointer is output, the additional element control unit 343 may display an obstacle in a movement path of the timing pointer, that is, a track, according to obstacle data included in the game data. The obstacle is the target which the timing pointer needs to avoid while moving until reaching the timing determination line, and when it is determined that the timing pointer collides with the obstacle, the matching determination unit 350 may also set points to be subtracted as a penalty.

As a result, the timing determination-type game method according to the present invention may progress the game by the scheme in which the user does not individually control at least one timing pointer or at least one input pointer, but moves at least one timing pointer or at least one input pointer in the unit of the group, such as the preset timing pointer group or input pointer group, and operates at least one timing pointer and at least one corresponding input pointer to match each other at a designated timing, thereby considerably increasing operation convenience, providing the timing determination-type game having difficulty and arising the user's interest, and easily creating new users which fail to get used to the existing timing determination-type game.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A timing determination-type game apparatus, comprising:
    an interface unit which receives a user command and output a game image; and
    a game control unit which configures a game image, in which one or more timing pointer groups including one or more timing pointers and one or more input pointer groups including one or more input pointers are displayed according to pre-stored game data, outputs the configured game image to a user via the interface unit, moves at least one group corresponding to the user command among the one or more timing pointer groups and the one or more input pointer groups and determines whether the one or more timing pointers included in the one or more timing pointer groups match the one or more input pointers that are designated to correspond to the one or more timing pointers at a timing pre-designated by the game data, respectively.

2. The timing determination-type game apparatus of claim 1, wherein the game control unit includes:
    a memory unit in which the game data is pre-stored;
    an input analyzing unit which receives the user command from the interface unit, analyzes the received user command, and generates an operation signal corresponding to the user command when it is determined that the user command is a command applied for progressing a game;
    a pointer control unit which receives the game data stored in the memory unit, displays each of the one or more timing pointer groups and the one or more input pointer groups on the game image at a pre-designated timing according to the game data, controls each of the one or more timing pointers to move along a designated movement path, and moves at least one group among the one or more timing pointer groups and the one or more input pointer groups in a direction designated by the operation signal in response to the operation signal;

a matching determination unit which determines whether the one or more timing pointers match the corresponding one or more input pointers at the designated timing, respectively, and outputs a determination result; and an image configuring unit which receives image data included in the game data from the memory unit, receives timing pointer information and input pointer information from the pointer control unit, receives the determination result from the matching determination unit, configures the game image, and outputs the configured game image via the interface unit.

3. The timing determination-type game apparatus of claim 2, wherein the pointer control unit includes:

a timing pointer control unit which acquires timing pointer data included in the game data, sets a time and a position at which the one or more timing pointer groups including the one or more timing pointers are to be displayed in a timing pointer area in which the one or more timing pointer groups are disposed in the game image, an attribute enabling the user to visually discriminate the one or more timing pointers included in the one or more timing pointer groups, respectively, and the movement path according to the acquired timing pointer data, and varies the positions of the one or more timing pointer groups within the timing pointer area according to the operation signal to generate the timing pointer information when the operation signal is the operation signal for the timing pointer group; and an input pointer control unit which acquires input pointer data included in the game data, sets a time and a position at which the one or more input pointer groups including the one or more input pointers are to be displayed in an input pointer area in which the one or more input pointer groups are disposed in the game image, and an attribute enabling the user to visually discriminate the one or more input pointers included in the one or more input pointer groups corresponding to the one or more timing pointers, respectively, according to the acquired input pointer data, and varies the positions of the one or more input pointer groups within the input pointer area according to the operation signal to generate the input pointer information when the operation signal is the operation signal for the input pointer group.

4. The timing determination-type game apparatus of claim 3, wherein the pointer control unit includes:

a plurality of tracks which is the movement path of each of the one or more timing pointers and provides a position reference for determining whether the one or more timing pointers match the one or more corresponding input pointers, respectively, on the game image, and an additional element control unit which controls whether to display a timing determination line that is disposed at one end of the input pointer area in a direction of the timing pointer area in order to indicate a timing for determining whether the one or more timing pointers match the one or more corresponding input pointers, respectively.

5. The timing determination-type game apparatus of claim 3, wherein the pointer control unit further includes an additional element control unit which additionally controls one or more obstacles that are displayed in the timing pointer area and generate a penalty when the one or more timing pointers moving along the movement path collide with the obstacles.

6. The timing determination-type game apparatus of claim 2, wherein the pointer control unit sets a width of a timing pointer area for displaying the one or more timing pointer groups or a width of an input pointer area for displaying the one or more input pointer groups to be larger than a width of the game image, and scrolls a timing pointer in the timing pointer area or an input pointer in the input pointer area, which is not displayed on the game image so as to be displayed on the game image in response to the operation signal.

7. The timing determination-type game apparatus of claim 2, wherein when the number of groups of at least one among the one or more timing pointer groups and the one or more input pointer groups is two or more, the pointer control unit displays a group area in which a visual attribute for easily visually discriminating the plurality of timing pointer groups or the plurality of input pointer groups is designated.

8. A timing determination-type game method of a timing determination-type game apparatus including an interface unit and a game control unit, the timing determination-type game method comprising:

analyzing, by the game control unit, pre-stored game data, and configuring a game image in which one or more timing pointer groups including one or more timing pointers and one or more input pointer groups including one or more input pointers are displayed according to the analyzed game data;

when a user command applied via the interface unit is a command applied for progressing a game, generating, by the game control unit, an operation signal, and moving at least one group among the one or more timing pointer groups and the one or more input pointer groups in response to the operation signal; and determining whether the one or more timing pointers included in the one or more timing pointer groups match the one or more input pointers that are designated to correspond to the one or more timing pointers at a timing pre-designated by the game data, respectively.

9. The timing determination-type game method of claim 8, wherein the configuring of the game image includes:

analyzing the game data;

displaying the one or more timing pointer groups including the one or more timing pointers, which moves a designated movement path, in a timing pointer area of the game image according to the game data; and displaying the one or more input pointers of the one or more input pointer groups, which have an attribute corresponding to an attribute of the timing pointer designated so as for a user to visually discriminate the one or more timing pointers of the one or more timing pointer groups displayed in the timing pointer area, respectively, according to the game data, in an input pointer area of the game image.

10. The timing determination-type game method of claim 9, wherein the moving of the at least one group among the one or more timing pointer groups and the one or more input pointer groups in response to the operation signal includes:

when the operation signal for the one or more timing pointer groups is applied while each of the one or more timing pointers displayed in the timing pointer area moves along a pre-designated movement path, maintaining a time at which each of the one or more timing pointers reaches the input pointer area and changing the movement paths, in which all of the timing pointers included in the one or more timing pointer groups move, according to the operation signal; and when the operation signal for the one or more input pointer groups is applied, moving the one or more input pointer groups within the input pointer area in response to the operation signal.

11. The timing determination-type game method of claim 9, wherein the configuring of the game image includes setting at least one of a width of the timing pointer area and a width of the input pointer area to be larger than a width of the game image so that the one or more timing pointers in the timing pointer area or the one or more input pointers in the input pointer area, which are not displayed on the game image, are scrolled and are displayed on the game image in response to the operation signal.

12. The timing determination-type game method of claim 9, wherein the configuring of the game image includes, when the number of groups of at least one among the one or more timing pointer groups and the one or more input pointer groups is two or more, displaying a group area in which an attribute for easily visually discriminating the plurality of timing pointer groups or the plurality of input pointer groups is designated.

13. The timing determination-type game method of claim 9, wherein the configuring of the game image further includes:
displaying a plurality of tracks which is the movement path of each of the one or more timing pointers and provides a position reference for determining whether the one or more timing pointers match the one or more corresponding input pointers, respectively, in at least one area between the timing pointer area and the input pointer area; and
displaying a timing determination line at one end of the input pointer area in a direction of the timing pointer area in order to indicate a timing for determining whether the one or more timing pointers match the one or more corresponding input pointers, respectively.

14. The timing determination-type game method of claim 9, wherein the configuring of the game image further includes displaying one or more obstacles for generating a penalty in the timing pointer area when the one or more timing pointers moving along the movement path collide with the obstacles.

15. A computer program stored on a non-transitory computer readable medium for executing the timing determination-type game method comprising: analyzing, by a game control unit, pre-stored game data, and configuring a game image in which one or more timing pointer groups including one or more timing pointers and one or more input pointer groups including one or more input pointers are displayed according to the analyzed game data; when a user command applied via the interface unit is a command applied for progressing a game, generating, by the game control unit, an operation signal, and moving at least one group among the one or more timing pointer groups and the one or more input pointer groups in response to the operation signal; and determining whether the one or more timing pointers included in the one or more timing pointer groups match the one or more input pointers that are designated to correspond to the one or more timing pointers at a timing pre-designated by the game data, respectively.

* * * * *